United States Patent
Ootsuka et al.

(10) Patent No.: US 7,512,816 B2
(45) Date of Patent: Mar. 31, 2009

(54) RECORDING APPARATUS RECEIVING CURRENT SUPPLY FROM AN ACCESSING APPARATUS

(75) Inventors: Takeshi Ootsuka, Hyogo (JP); Hideaki Yamashita, Kyoto (JP); Haruo Ohta, Kyoto (JP)

(73) Assignee: Panasonic Corporation, Osaka (JP)

(*) Notice: Subject to any disclaimer, the term of this patent is extended or adjusted under 35 U.S.C. 154(b) by 365 days.

(21) Appl. No.: 10/580,199

(22) PCT Filed: Nov. 19, 2004

(86) PCT No.: PCT/JP2004/017268

§ 371 (c)(1),
(2), (4) Date: May 30, 2006

(87) PCT Pub. No.: WO2005/057475

PCT Pub. Date: Jun. 23, 2005

(65) Prior Publication Data

US 2007/0055821 A1    Mar. 8, 2007

(30) Foreign Application Priority Data

Nov. 28, 2003    (JP) ............................. 2003-399056

(51) Int. Cl.
G06F 1/00 (2006.01)
G06F 1/26 (2006.01)
G06F 9/00 (2006.01)

(52) U.S. Cl. ............................. 713/300; 713/320; 713/2
(58) Field of Classification Search ................. 713/300, 713/320
See application file for complete search history.

(56) References Cited

U.S. PATENT DOCUMENTS

| | | | | |
|---|---|---|---|---|
| 5,623,618 | A * | 4/1997 | Brewer et al. ................... 711/2 |
| 6,173,900 | B1 * | 1/2001 | Yoshigi et al. ............... 235/492 |
| 6,272,610 | B1 * | 8/2001 | Katayama et al. ........... 711/171 |
| 6,581,830 | B1 * | 6/2003 | Jelinek et al. ............... 235/441 |
| 6,633,956 | B1 | 10/2003 | Mitani |
| 6,824,045 | B2 * | 11/2004 | Yap et al. ..................... 235/375 |
| 7,014,121 | B2 * | 3/2006 | Chang et al. ................. 235/492 |
| 2002/0078297 | A1 | 6/2002 | Toyama et al. |
| 2004/0230789 | A1 * | 11/2004 | Lee ............................... 713/2 |

FOREIGN PATENT DOCUMENTS

| | | |
|---|---|---|
| JP | 2000-207137 | 7/2000 |
| JP | 2001-297316 | 10/2001 |
| JP | 2002-109494 | 4/2002 |
| JP | 2002-189992 | 7/2002 |
| JP | 2003-036205 | 2/2003 |

* cited by examiner

Primary Examiner—Suresh K Suryawanshi
(74) Attorney, Agent, or Firm—Wenderoth, Lind & Ponack, L.L.P.

(57) ABSTRACT

In a recording device having one or more semiconductor memories mounted thereon, the number of semiconductor memories operating in parallel is restricted according to an available supply current of an accessing apparatus to which the recording device is attached.

21 Claims, 18 Drawing Sheets

FIG. 4

| | 7 | 6 | 5 | 4 | 3 | 2 | 1 | 0 | |
|---|---|---|---|---|---|---|---|---|---|
| Features | \multicolumn{8}{l|}{Sub command "05h"} | 341 |
| Sector Count | \multicolumn{8}{l|}{Advanced power management level} | 342 |
| Sector Number | \multicolumn{8}{l|}{na} | 343 |
| Cylinder Low | \multicolumn{8}{l|}{na} | 344 |
| Cylinder High | \multicolumn{8}{l|}{na} | 345 |
| Device/Head | na | na | na | DRV (0) | | | | | 346 |
| Command | \multicolumn{8}{l|}{Command "FEh"} | 347 |

(340)

RECORDING APPARATUS RECEIVING CURRENT SUPPLY FROM AN ACCESSING APPARATUS

BACKGROUND OF THE INVENTION

1. Technical Field

The present invention relates to technology for accessing a semiconductor memory according to instructions of an accessing apparatus, in particular to technology for performing the access in accordance with the amount of current that can be applied by the accessing apparatus.

2. Background Art

Since being compact, light and slim and allowing easy manipulation, SD cards and other memory cards equipped with flash memories therein are widely employed in digital apparatuses such as digital still cameras. The storage capacities of commercially available memory cards are in general from 16 to 512 MB, and the recording rates are up to 10 MB/s or so.

For recording data with large storage space requirements, such as video and audio data in DV format, however, the above storage capacities and recording rates are not sufficient. In the case of data with a reproduction rate of 4 MB/s, for example, only two-minute's worth of data can be recorded, and the writing process takes about one minute.

In order to solve these problems, Patent References 1 and 2 disclose memory card drives capable of mounting multiple memory cards thereon. According to the disclosed technology, a large storage capacity is attained by using more than one memory card placed in a memory card drive. In addition, an improvement in the recording rate is achieved by writing data into multiple memory cards in parallel using striping, which is known as one of the RAID formats.

In the case of using such a memory card drive connected to a personal computer (hereinafter, "PC") or another electric apparatus, the amount of the current that the electric apparatus is able to supply to the memory card drive differs from one electric apparatus to another. When it comes to PCs, for example, the current that can be supplied by a PC to a memory card drive is defined in the PC card standard as 1 A. However, the available supply current practically varies among types of PCs due to their heat release characteristics and the like.

When two or more memory cards are operated in parallel using a memory card drive, the consumption current of the memory card drive increases in proportion to the number of memory cards in operation. Operating four memory cards each having a consumption current of 200 mA, for instance, claims a total consumption current of 800 mA. Accordingly, PCs applicable to this memory card drive are limited only to those feasible to supply 800 mA or more current to the memory card drive.

<Patent Reference 1> Japanese Laid-Open Patent Application Publication No. 2002-189992

<Patent Reference 2> Japanese Laid-Open Patent Application Publication No. 2000-207137

SUMMARY OF THE INVENTION

Problem that the Invention is to Solve

However, it is inconvenient for users that connectable electric apparatuses are limited according to their available supply current, and there has been a call for an applicable memory card drive independent of the amount of current able to be supplied by an electric apparatus to which the memory card drive is connected. The present invention has been made in view of the problem above, and aims at offering a recording device and a memory card drive device capable of changing their operating conditions according to the amount of current that can be supplied by an electric apparatus to which the recording device or the memory card drive device is connected, and controlling their consumption current to be at or below the available supply current of the electric apparatus.

In order to achieve the above stated objective, the present invention is a recording device comprising: one or more semiconductor memories; an obtaining unit operable to obtain an upper limit of current to be supplied from an accessing apparatus to the recording device; a command obtaining unit operable to obtain from the accessing apparatus at least one command, a type of which is one of a write command instructing data writing to the semiconductor memories and a read command instructing data reading from the semiconductor memories; an access unit operable to receive current supply from the accessing apparatus and access the semiconductor memories according to a control signal; and a control unit operable to calculate an access upper limit by subtracting the amount of current consumed by individual units other than the semiconductor memories and the access unit from the upper limit, set operating conditions of the access unit and the semiconductor memories according to the type of the obtained command, using the access upper limit, generate the control signal based on the obtained command and the operating conditions, and output the control signal.

The control unit here corresponds to a parallel control unit, a control information storage unit and a clock control unit in the embodiments hereinafter described. In addition, the control signal corresponds to a write direction, a read direction and a clock signal.

Advantageous Effects of the Invention

According to the structure above, the recording device of the present invention sets the operating conditions based on the access upper limit which is calculated from the upper limit obtained from the accessing apparatus. Accordingly, by setting appropriate operating conditions, the present invention enables access to the semiconductor memories, requiring electric current no more than the amount supplied by the accessing device.

The recording device above is characterized by: the control unit prestoring therein a current consumption value representing the amount of current consumed by the access unit and the semiconductor memories, with respect to each type of the write and the read commands, and setting the operating conditions corresponding to the type of the obtained command using the access upper limit and the current consumption value.

According to the structure above, the control unit sets operating conditions corresponding to the command. That is, in the case when the electric power consumed by the semiconductor memories and access unit varies depending on a command output from the accessing device, the control unit is capable of setting the best suited operating conditions with respect to each command. This enables the access unit to access the semiconductor memories on the most appropriate operating conditions for each command.

The recording device above is characterized by: the control unit setting the operating conditions so that cause a parallel-operation count of memories out of the semiconductor memories to operate in parallel, and outputting to the access unit the control signal generated based on the obtained command and the operating conditions, and instructing access to the parallel-operation count of memories; and the access unit accesses the parallel-operation count of memories. Here, the parallel-operation count is smaller than or equal to number of pieces of all the semiconductor memories.

According to the structure above, the control unit sets the operating conditions so that the parallel-operation memories, which are selected from among the semiconductor memories of the recording device, operate in parallel. Here, the number of the parallel-operation memories matches the number of all or some of the semiconductor memories. That is, the number of semiconductor memories for parallel operations is limited. The amount of current consumed by the recording device corresponds to the number of semiconductor memories in the parallel operations. Therefore, limiting the number of semiconductor memories for the parallel operations guarantees reliable restriction of the amount of current consumed by the recording device.

The recording device above is characterized by: the current consumption value representing the amount of current consumed by the access unit and the semiconductor memories for causing one of the semiconductor memories to operate; and the control unit calculating, as the parallel-operation count, a quotient obtained by dividing the access upper limit by the current consumption value.

According to the structure above, the control unit is able to readily work out the number of parallel-operation memories by calculating a quotient, which is obtained by dividing the access upper limit by the consumption current value.

The recording device above is characterized by: the access unit including as many access subunits as the semiconductor memories, and each of the access subunits corresponding to a different one of the semiconductor memories; the control unit generating the control signal that includes as many access signals as the parallel-operation count of memories; each of the access signals being for instructing a different one of the access subunits to access a corresponding semiconductor memory thereof; the control unit outputting each of the access signals to a corresponding one of the access subunits; and access subunits that received the access signals accessing corresponding semiconductor memories according to the received access signals.

According to the structure above, the control unit outputs each access signal to a different one of the access subunits, and the access subunits that received the access signals have access to the corresponding semiconductor memories. Therefore, sequentially outputting access instructions to the respective access units enables data to be written to the semiconductor memories of the recording device in rotation, which allows the respective semiconductor memories to store therein a more or less even amount of data. This avoids a reduction in the number of semiconductor memories operable in parallel. Accordingly, a decrease in access speed of the recording device can be prevented.

The recording device of the present invention is characterized by: the control unit setting the operating conditions that cause the semiconductor memories to operate at a memory frequency which is no more than a maximum operating frequency of the semiconductor memories, generating a clock signal having the same frequency as the memory frequency based on the command and the operating conditions, and outputting to the access unit the control signal including the generated clock signal; and the access unit outputting the clock signals received from the control unit to the semiconductor memories and has access to the semiconductor memories.

According to the structure above, the access unit outputs to the semiconductor memories the clock signal having a frequency no more than the maximum operating frequency of the semiconductor memories, and accesses the semiconductor memories. Since the semiconductor memories operate in accordance with the clock signal received from the access unit, the operating frequency of the semiconductor memories can be set low by reducing the frequency of the clock signal. The operating frequency of the semiconductor memories is proportional to the consumption current value of the semiconductor memories and the access unit. As a result, the consumption current of the recording device can be suppressed to the upper limit or lower by setting the memory frequency based on the access upper limit and changing the operating frequency of the semiconductor memories into the memory frequency.

The recording device of the present invention is characterized by: the control unit prestoring therein, as the current consumption value, a maximum current value which represents the amount of current consumed by the access unit and the semiconductor memories when each of the semiconductor memories operate at the maximum operating frequency, and calculating the memory frequency using the access upper limit and the ratio of the maximum operating frequency to the maximum current value.

According to the structure above, the control unit can readily calculate the operating frequency using the access upper limit and the ratio of the maximum operating frequency to the maximum current value.

The recording device of the present invention above is characterized by: the control unit prestoring therein the maximum operating frequency together with the maximum current value.

According to the structure above, the control unit prestores the maximum operating frequency together with the maximum current value, and is therefore able to calculate the operating frequency promptly.

In addition, the control unit prestores therein the current consumption value associated with the read command, and sets the operating conditions the semiconductor memories to operate at the memory frequency in response to the command.

According to the structure above, the control unit sets the operating conditions so that the semiconductor memories operate at the memory frequency in response to the command instructing data reading, and the semiconductor memories perform reading operations at the operating frequency which is the same as the memory frequency. To write data to semiconductor memories requires injection of a specific amount of electrons, and there is no correlation between the frequency and the amount of current consumed. Accordingly, as to writing operations, changing the operating frequency does not lead to a reduction in the consumption current. Here, the amount of consumption current can be reduced by performing the reading operations at the memory frequency when a command instructing data reading has been received from the accessing device.

The recording device of the present invention is characterized by: the control unit including a frequency divider, generating the clock signal having the same frequency as the memory frequency using the frequency divider, and outputting the control signal each including the generated clock signal.

According to the structure above, the control unit is capable of readily changing the frequency of the clock signal using the frequency divider.

In addition, the control unit may include a PLL (Phase Lock Loop), generate the clock signal having the same frequency as the memory frequency using the PLL, and output the control signal including the generated clock signal.

According to the structure above, the control unit can continuously change the frequency of the clock signal using the PLL. As a result, the control unit is capable of generating and outputting the clock signal having the best suited frequency for the access upper limit and the command obtained by the command obtaining unit.

The recording device of the present invention is characterized by: the control unit setting, as the operating conditions, a 1st operating condition that causes a parallel-operation count of memories out of the semiconductor memories operate in parallel and a 2nd operating condition that causes the semiconductor memories to operate at an operating frequency no more than a maximum operating frequency of the semiconductor memories, adopting at least one of the 1st and 2nd operating conditions based on the type of the obtained command, and generating the control signal based on the adopted operating condition.

According to the structure above, the control unit adopts at least one of the 1st and 2nd operating conditions, and outputs the control signals based on the adopted operating condition. Thus, by changing one or both of the number of parallel-operation memories and the operating frequency of the semiconductor memories, the control unit is capable of setting the most appropriate operating conditions while keeping the required amount of electric current within the access upper limit. Therefore, the access unit can have access to the semiconductor memories at high speed, making best use of the current no more than the access upper limit.

The semiconductor memories of the recording device of the present invention may be flash memories. Flash memories are today widely in use and a lot of practical achievements in producing flash memories have already been made. Therefore, the recording device having the above-mentioned structure can easily be produced. The semiconductor memories of the recording device of the present invention may be nonvolatile magnetic memories.

Nonvolatile magnetic memories enables high-speed data input and output. At the same time, data is retained by not electric charge but electron spin, which results in a semipermant record retention time. According to the structure above, the recording device has excellent record retention performance and allows for higher-speed data access.

The recording device of the present invention is characterized by: the obtaining unit obtaining the upper limit by a Set Features command complying with ATA (AT Attachment) standard.

According to the structure above, the recording device of the present invention is applicable to various electric apparatuses complying with the ATA standard.

The recording device of the present invention is characterized by: the semiconductor memories being portable and detachable from the recording device; and the obtaining unit, the access unit and the control unit making up a memory card drive device for reading and writing information from/to the semiconductor memories.

According to the structure above, the recording device comprises portable semiconductor memories and a memory card drive device. Thus, the memory card drive device allows for high-speed data input and output, using existing, commercially available memory cards as the portable semiconductor memories.

The recording device of the present invention is characterized by: the control unit outputting the control signal including a clock signal; and the access unit supplying the clock signal only to one or more of the semiconductor memories being accessed, and stopping supply of the clock signal to remaining one or more of the semiconductor memories being not accessed.

According to the structure above, the access unit stops supply of the clock signal to semiconductor memories being currently not accessed. In the case where existing memory cards are used as the portable semiconductor memories, each of the memory cards generally includes a control unit and a storage unit. Even if not receiving a request for access to data, the control units of the memory cards carry out predefined operations when receiving the clock signal and consume electric power. Therefore, the access unit stops the supply of the clock signal to the memory cards being currently not accessed, which leads to a cut in the power consumption by the amount otherwise consumed by the control units of these nonaccessed memory cards.

BRIEF DESCRIPTION OF THE DRAWINGS

FIG. 4 shows an example of a structure of an ATA command given and received between the PC 100 and the memory card 300;

EXPLANATION OF REFERENCES

Figure 1:
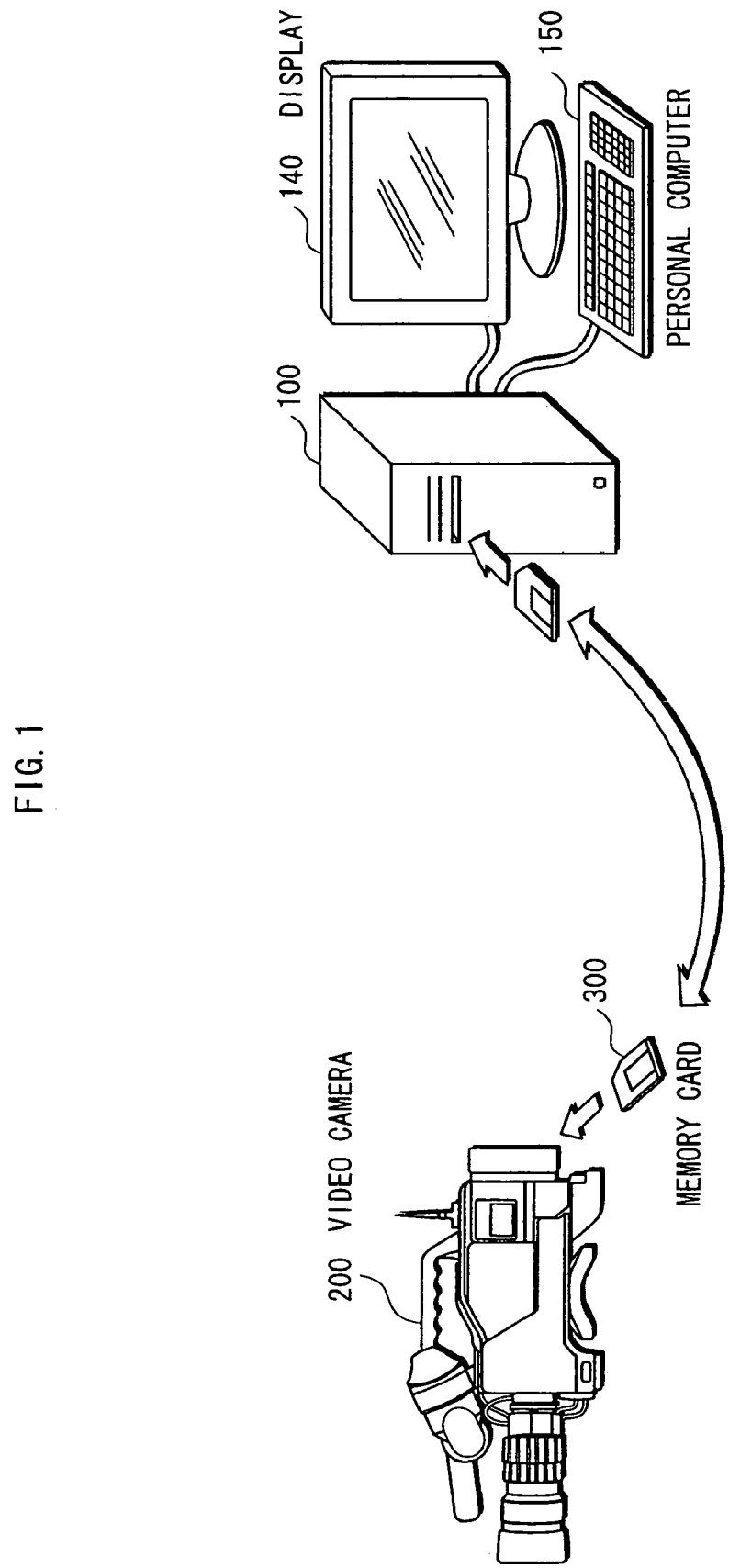
FIG. 1 shows an example of the use of a memory card 300.

100 PC
200 video camera
300 memory card
301 external IF unit
302 control unit
303 command analysis unit
304 parallel control unit
305 clock control unit 308 control information storage unit
309 buffer memory
310-313 flash memory
321 command execution unit
600 memory card
700 memory card drive

DETAILED DESCRIPTION OF THE INVENTION

Detailed descriptions of embodiments according to the present invention are given below with the aid of drawings.

1. Embodiment 1

A memory card 300 of Embodiment 1 is used while being set in a PC 100 or a video camera 200 as shown in FIG. 1.

The video camera 200 generates audio and image data and records the generated audio and image data in the memory card 300.

The PC 100 is connected to a display 140 and a keyboard 150, and plays or edits data stored in the memory card 300 according to the user's operation.

The memory card 300 is equipped with four flash memories. The memory card 300 obtains a value representing the maximum current that an external apparatus—specifically speaking, the PC 100 or video camera 200—can supply to the memory card 300 (hereinafter, referred to as "available supply current value") and calculates, based on the obtained available supply current value, how many flash memories are operable in parallel. The memory card 300 causes the calculated number of flash memories to operate in parallel in response to a command from the PC 100.

1.1 Video Camera 200

Figure 2:
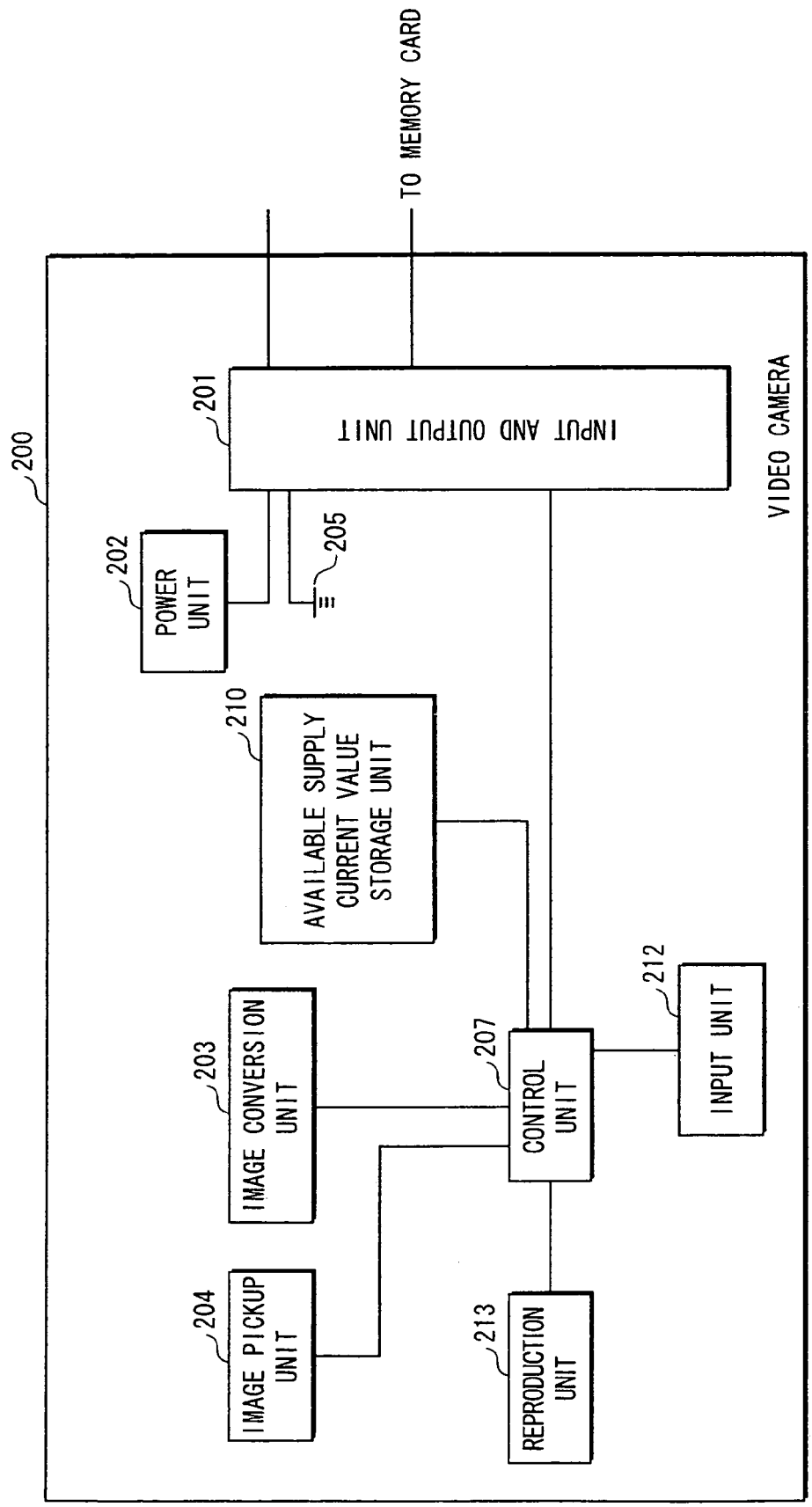
FIG. 2 is a block diagram showing a structure of a video camera 200.

The video camera 200 comprises, as shown in FIG. 2: an input and output unit 201; a power unit 202; an image conversion unit 203; an image pickup unit 204; a control unit 207; an input unit 212; and a reproduction unit 213.

The video camera 200 includes, concretely speaking, a microprocessor, a RAM and a ROM. Computer programs are stored in the RAM and ROM. The microprocessor operates according to the computer programs, and thereby the video camera 200 fulfills its function.

(1) Power Unit 202

The power unit 202 supplies electric power from batteries or an external source to each circuit constituting the video camera 200. The power unit 202 also supplies electric power to the memory card 300 via the input and output unit 201.

(2) Available Supply Current Value Storage Unit 210

The available supply current value storage unit 210 is constituted with a ROM, and stores an available supply current value therein. The available supply current value is a value indicating an upper limit of current that the video camera 200 is capable of supplying to the memory card 300.

(3) Input and Output Unit 201

The input and output unit 201 is connected to the memory card 300, and performs input and output of various information between the control unit 207 and the memory card 300.

In addition, the input and output unit 201 supplies power from the power unit 202 to the memory card 300.

(4) Image Pickup Unit 204 and Image Conversion Unit 203

The image pickup unit 204 comprises optical lenses, color filters, CCDs (Charge Coupled Devices) and the like, and generates image data by converting incident light into electric charges.

The image conversion unit 203 compresses image data generated by the image pickup unit 204, using DCT (Discrete Cosine Transform)—one of the orthogonal conversion, quantization, motion compensation, variable length coding, or the like.

(5) Control Unit 207

The control unit 207 controls operations of individual units constituting the video camera 200.

The control unit 207 also detects, via the input and output unit 201, the memory card 300 being set in the video camera 200. When detecting the memory card 300, the control unit 207 implements a configuration process including allocation of drives and memory space.

After completing the configuration process, the control unit 207 gives and receives information concerning power management, using the available supply current value stored in the available supply current value storage unit 210. Such initialization processes between the memory card 300 and a device in which the memory card 300 is set are explained in detail hereinafter.

(6) Input Unit 212

The input unit 212 is equipped with a variety of buttons and the like, detects a user's operation, and outputs to the control unit 207 operation directing information that indicates the detected operation.

(7) Reproduction Unit 213

The reproduction unit 213 includes a decoder and a liquid crystal display, expands compressed image data, generates a screen and presents the generated screen on the liquid crystal display.

1.2 PC 100

Figure 3:
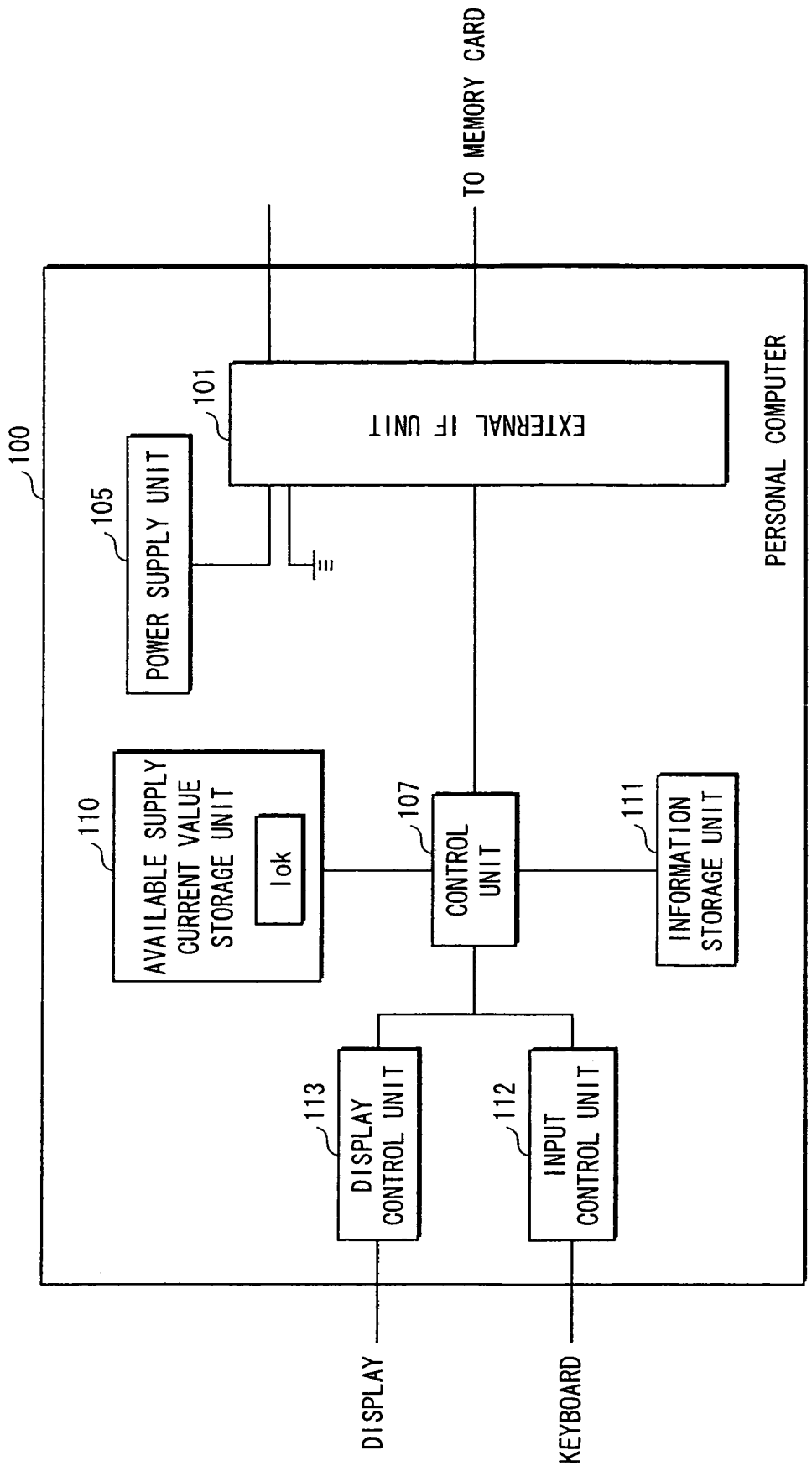
FIG. 3 is a block diagram showing a structure of a PC 100.

The PC 100 comprises, as shown in FIG. 3: an external IF unit 101; an available supply current value storage unit 110; an information storage unit 111; an input control unit 112; and a display control unit 113.

The PC 100 is, specifically speaking, a computer system including a microprocessor, a RAM and a ROM. Computer programs are stored in the RAM, ROM and information storage unit 111. The microprocessor operates according to the computer programs, and thereby the PC 100 fulfills its function.

(1) Power Supply Unit 105

The power supply unit 105 supplies electric power to each circuit constituting the PC 100. The power supply unit 105 also supplies electric power to the memory card 300 via the external IF unit 101.

(2) Available Supply Current Value Storage Unit 110 and Information Storage Unit 111

The available supply current value storage unit 110 is constituted with a ROM, and stores therein an available supply current value Iok. The available supply current value Iok is a value indicating an upper limit of current that the PC 100 can supply to the memory card 300.

The information storage unit 111 is constituted with a hard disk unit, and stores therein a variety of data, computer programs and the like.

(3) External IF Unit 101

The external IF unit 101 is connected to the memory card 300, and performs input and output of various information between the control unit 107 and the memory card 300.

In addition, the external IF unit 101 supplies power from the power supply unit 105 to the memory card 300.

(4) Control Unit 107

The control unit 107 controls operations of individual units constituting the PC 100.

The control unit 107 detects the memory card 300 via the external IF unit 101.

In addition, the control unit 107 receives, from the input control unit 112, operation directing information corresponding to the key operation of the user.

(4-1) Initialization

When detecting the memory card 300, the control unit 107 implements a configuration process including allocation of drives and memory space.

After completing the configuration process, the control unit 107 requests the memory card 300 for a maximum current consumption value Imax, which represents a maximum amount of the current consumed by the memory card 300. The control unit 107 receives the maximum current consumption value Imax from the memory card 300 via the external IF unit 101. As receiving the maximum current consumption value Imax, the control unit 107 reads out the available supply current value Iok from the available supply current value storage unit 110, and outputs the readout available supply current value Iok to the memory card 300 via the external IF unit 101. Subsequently, the control unit 107 receives an Ack (Acknowledgement) signal from the memory card 300, and ends the initialization.

(4-2) Writing Process

Receiving from the input control unit 112 operation directing information that indicates writing data to the memory card 300, the control unit 107 generates a write command directing the memory card 300 to perform data writing. The write command includes a sector number that is a logical address of a sector with which the writing begins (hereinafter, referred to as the "start sector number") and the number of sectors required for recording data. A sector is the unit of data reading and writing from/into the memory card 300, and has a storage area of 512 bytes.

Next, the control unit 107 outputs the generated write command to the memory card 300 via the external IF unit 101.

The control unit 107 subsequently receives from the memory card 300 a response indicating that data writing is possible. Receiving the response, the control unit 107 outputs data equivalent to one sector, or 512 bytes, which is obtained from the beginning of data to be written into the memory card 300. In the following description, data of 512 bytes is referred to as a data block. Receiving from the memory card 300 a response indicating that writing one data block is possible, the control unit 107 outputs the next data block. In a similar fashion, the control unit 107 repeats the response reception and data block output until all data blocks are output.

(4-3) Reading Process

Receiving from the input control unit 112 operation directing information that indicates reading data from the memory card 300, the control unit 107 outputs a read command directing the memory card 300 to perform data reading. The read command includes a sector number that is a logical address of a sector with which the reading begins (hereinafter, referred to as the "start sector number") and the number of sectors to be read.

The control unit 107 subsequently receives from the memory card 300 a response indicating that outputting one data block is possible. Then, the control unit 107 receives from the memory card 300 a data block of 512 bytes—corresponding to one sector. In a similar fashion, the control unit 107 repeats the response reception and data block reception until the number of received data blocks matches the number of sectors included in the output read command.

Note that control information, such as the maximum consumption current value and the available supply current value, and various commands are given and received between the PC 100 and the memory card 300 via ATA (AT Attachment) commands.

FIG. 4 shows a frame structure of an ATA command used when the PC 100 outputs the available supply current value Iok to the memory card 300. In the figure, a name of each field making up the frame is shown in the left column, while numbers 0 to 7, each of which indicates a bit number, are shown in the top row. A Features field 341 is a field that includes subcommands and other extended contents of the command. A Sector Count field 342 is a field that stores therein the available supply current value, the number of sectors and the like. Here, the available supply current value of the PC 100 is the value measured at Advanced Power Management level. A Sector Number field 343 is a field that stores therein the number of sectors when the output ATA command is a read/write command, although the field is not used when the available supply current value Iok is output. "na" in the figure indicates that the fields are not in use.

A Cylinder Low field 344, a Cylinder High field 345 and a Device/Head field 346 are fields storing therein information that indicates sectors of the reading/writing destination when the ATA command is a read/write command, although these fields are not used in this instance.

A Command field 347 is a field storing therein a variety of commands. Here, "FEh" indicating notice of the available supply current value Iok is stored in the field.

The structure of ATA commands is in the public domain, and the detailed explanation is therefore left out here.

(5) Input Control Unit 112 and Display Control Unit 113

Connected to the keyboard 150, the input control unit 112 detects a key operation of the user and outputs to the control unit 107 operation directing information indicating the detected key operation.

The display control unit 113 generates a screen to be presented on the display 140 according to a direction of the control unit 107. The display control unit 113 then outputs the generated screen to the display 140 in synchronization with vertical and horizontal sync signals.

1.3 Memory Card 300

Figure 5:
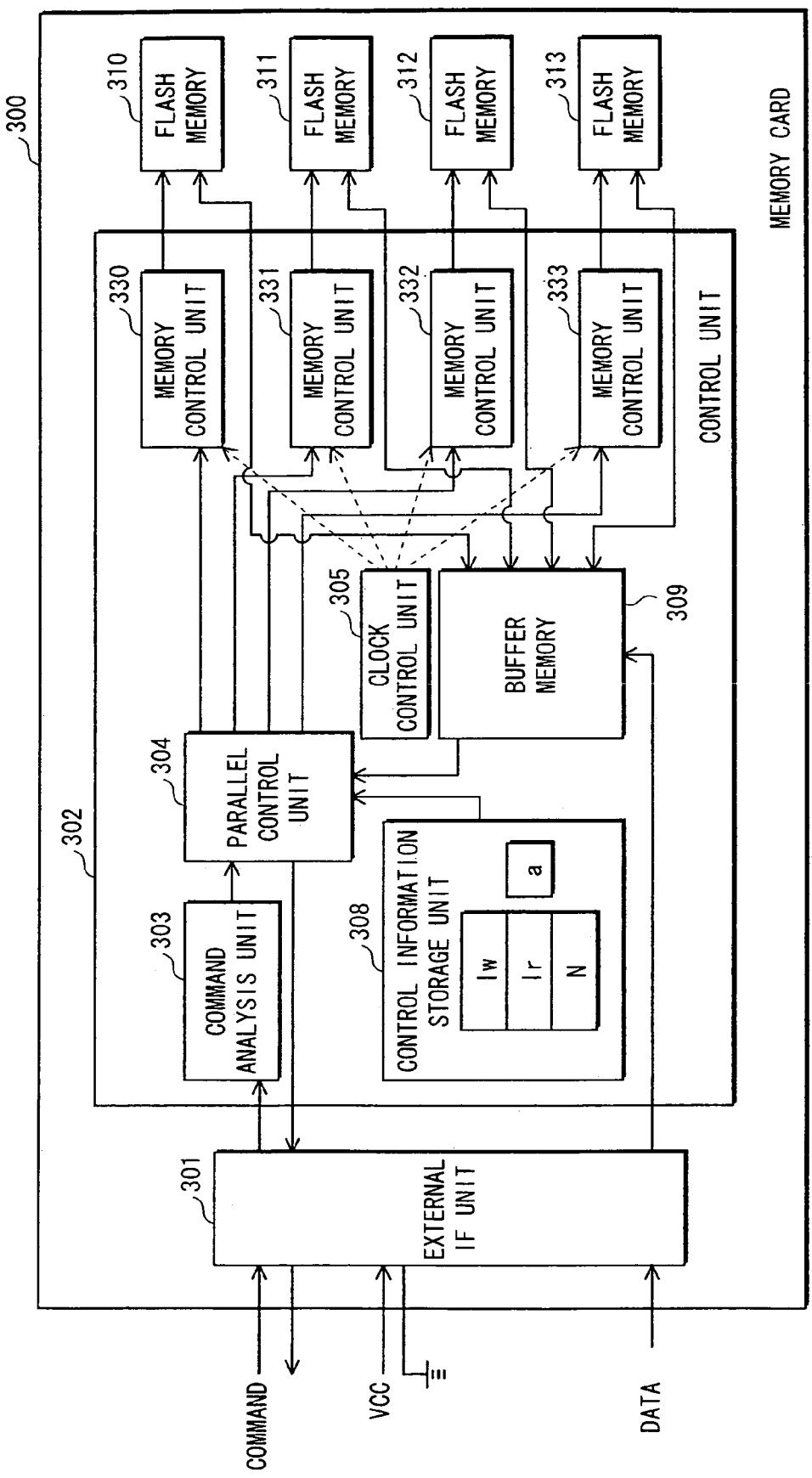
FIG. 5 is a block diagram showing a structure of the memory card 300.

The memory card 300 comprises, as shown in FIG. 5: an external IF unit 301; a control unit 302; and flash memories 310, 311, 312 and 313. The control unit 302 includes a command analysis unit 303, a parallel control unit 304, a clock control unit 305, memory control units 330, 331, 332 and 333, a control information storage unit 308 and a buffer memory 309.

The control unit 302 includes, concretely speaking, a microprocessor, a RAM and a ROM. Computer programs are stored in the RAM and ROM. The microprocessor operates according to the computer programs, and thereby the control unit 302 fulfills its function.

(1) Flash Memories 310, 311, 312 and 313

The flash memories 310, 311, 312 and 313 individually include multiple sectors, each of which has a capacity of 512 bytes. A memory address is assigned to each sector. Each flash memory is separately connected to the buffer memory 309, as shown in FIG. 5. In addition, the flash memories 310, 311, 312 and 313 are connected to the memory control units 330, 331, 332 and 333, respectively.

The flash memories 310, 311, 312 and 313 receive a clock signal from the clock control unit 305 via the memory control units 330, 331, 332 and 333, respectively. With respect to each sector, the flash memories 310, 311, 312 and 313 record therein various data and output recorded data according to the control of the memory control units 330, 331, 332 and 333.

(2) External IF Unit 301

The external IF unit 301 transmits and receives various information between an external apparatus and the control unit 302. The external IF unit 301 also receives electric power supplied from the external apparatus and outputs the received power to each circuit constituting the memory card 300. Here, the external apparatus means the PC 100 or video camera 200.

Note that the data input and output speeds between the external IF unit 301 and the external apparatus are sufficiently fast, as compared with those between the buffer memory 309 and the flash memories 310 to 313.

(3) Control Information Storage Unit 308 and Buffer Memory 309

The control information storage unit 308 is constituted with a ROM, and stores therein a write current consumption value Iw, a read current consumption value Ir, the number of memories N and a control current value a.

The write current consumption value Iw is the amount of current consumed by a pair of a memory control unit and a flash memory of the memory card 300 when data is written to the single flash memory. The read current consumption value Ir is the amount of current consumed by a pair of a memory control unit and a flash memory when data is output from the single flash memory. Here, the sum of the current consumed by the memory control units 330 to 333 and flash memories 310 to 313 is proportional to the number of flash memories in operation.

The number of memories N is the number of flash memories provided in the memory card 300, and N=4 here in the present embodiment. The control current value a is the sum of the current consumed by individual circuits other than the flash memories and memory control units.

The buffer memory 309 is constituted with a RAM, and has four areas, each of which stores therein data equivalent to 512 bytes. The four storage areas respectively correspond to a different one of the flash memories 310 to 313. The buffer memory 309 temporarily stores therein a variety of data input and output between the flash memories 310 to 313 and the external apparatus.

Specifically speaking, the buffer memory 309 receives a data block of 512 bytes from the external apparatus via the external IF unit 301, and stores therein the received data block. Each time when receiving one data block, the buffer memory 309 outputs to the parallel control unit 304 an OK signal indicating that the data block has been properly received. According to the control of the memory control units 330 to 333, the buffer memory 309 outputs the stored data block to the flash memory 310, 311, 312 or 313.

In addition, the buffer memory 309 receives a data block from the flash memory 310, 311, 312 or 313, and stores therein the received data block on a temporary basis. According to a direction of the parallel control unit 304, the buffer memory 309 then outputs the stored data block to the external apparatus via the external IF unit 301. After the output of the data block is completed, the buffer memory 309 outputs to the parallel control unit 304 an OK signal indicating that the output has been finished properly.

(4) Clock Control Unit 305

The clock control unit 305 generates a clock signal at predetermined time intervals, and outputs the generated clock signal to each unit constituting the memory card 300.

(5) Command Analysis Unit 303

The command analysis unit 303 receives a variety of commands from an external apparatus connected to the external IF unit 301, analyzes each received command, and outputs the analysis result to the parallel control unit 304.

(6) Memory Control Units 330, 331, 332 and 333

The memory control unit 330 receives a clock signal from the clock control unit 305 and outputs the received clock signal to the flash memory 310.

The memory control unit 330 receives from the parallel control unit 304 a write direction indicating data writing together with a memory address indicating, within the flash memory 310 in which writing takes place, a sector for writing a data block thereto. In addition, the memory control unit 330 receives from the parallel control unit 304 a read direction indicating data reading along with a memory address indicating, within the flash memory 310 in which reading takes place, a sector for reading a data block therefrom.

Receiving a write direction and a memory address, the memory control unit 330 writes a data block stored in the buffer memory 309 into a sector of the flash memory 310, corresponding to the received memory address.

After completing the writing to the flash memory 310, the memory control unit 330 outputs to the parallel control unit 304 an end signal indicating that writing one data block is completed.

When receiving a read direction and a memory address from the parallel control unit 304, the memory control unit 330 outputs to the buffer memory 309 a data block stored in a sector of the flash memory 310, corresponding to the received memory address. After completing the output of the data block, the memory control unit 330 outputs to the parallel control unit 304 an end signal indicating that reading one data block is completed.

The memory control units 331, 332 and 333 implement a similar control performed by the memory control unit 330 over the flash memories 311, 312 and 313, respectively.

(7) Parallel Control Unit 304

Figure 6:
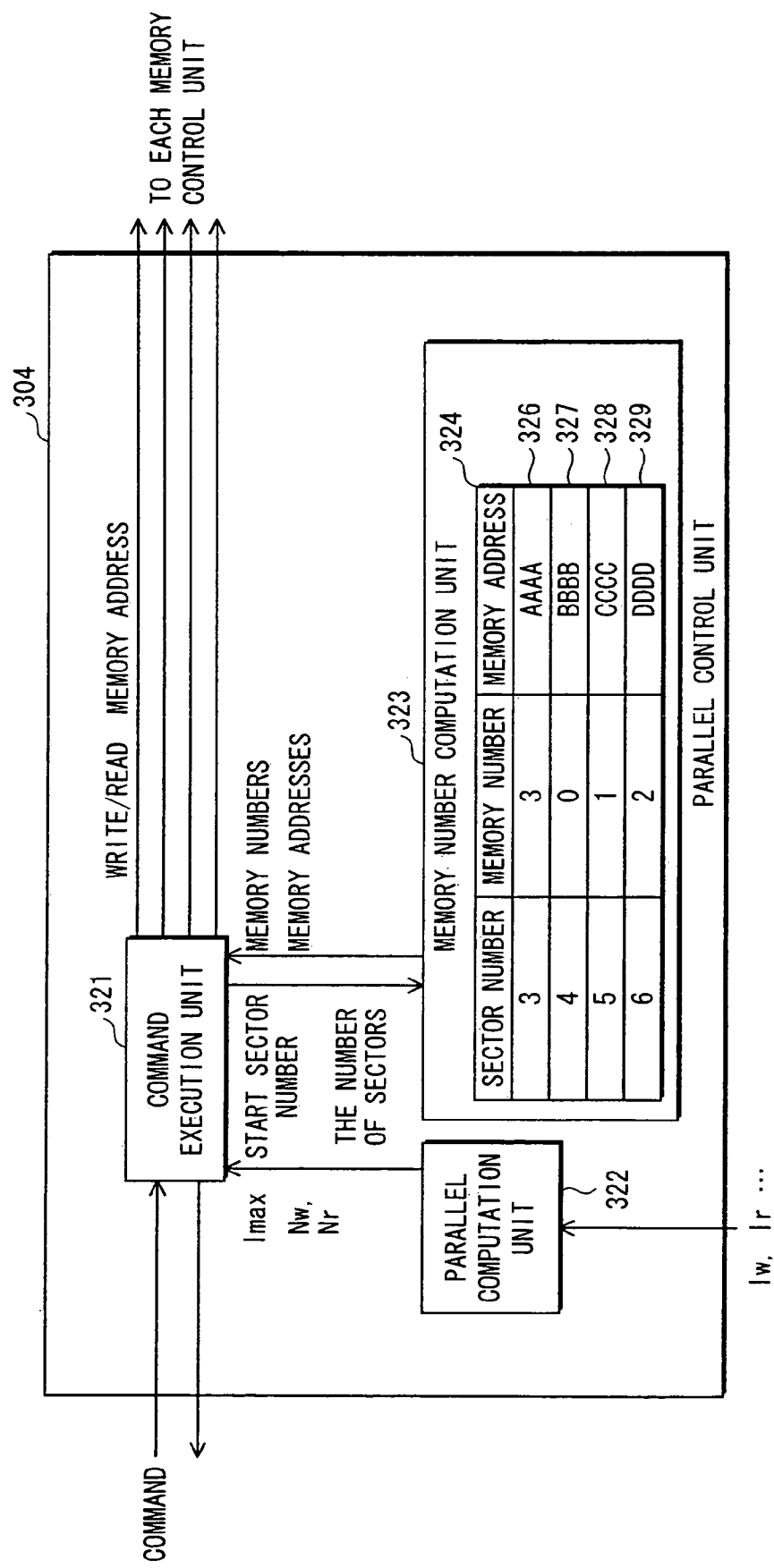
FIG. 6 is a block diagram showing a structure of a parallel control unit 304.

The parallel control unit 304 comprises, as shown in FIG. 6: a command execution unit 321; a parallel computation unit 322; and a memory number computation unit 323.

(7-1) Parallel Computation Unit 322

The parallel computation unit 322 is directed by the command execution unit 321 to calculate the maximum current consumption value Imax which is a maximum amount of the current consumed by the memory card 300. The parallel computation unit 322 also receives the available supply current value Iok from the command execution unit 321, and is directed to calculate a parallel write count Nw and a parallel read count Nr. The parallel write count Nw is the number of flash memories capable of performing data writing in parallel within the available supply current value, while the parallel read count Nr is the number of flash memories capable of performing data reading in parallel within the available supply current value.

Directed to calculate the maximum current consumption value Imax, the parallel computation unit 322 reads out from the control information storage unit 308 the write current consumption value Iw, the read current consumption value Ir, the number of memories N and the control current value a. Based on the readout write current consumption value Iw, read current consumption value Ir, number of memories N and control current value a, the parallel computation unit 322 calculates:

$$I\max = \mathrm{Max}(N \times Iw, N \times Ir) + a \qquad \text{(Eq. 1)}.$$

Here, "Max(A, B)" means a larger one of A and B. The parallel computation unit 322 outputs the calculated maximum current consumption value Imax to the command execution unit 321.

Directed to calculate the parallel write count Nw and the parallel read count Nr, the parallel computation unit 322 compares the received available supply current value Iok and the calculated maximum current consumption value Imax. When Iok<Imax, the parallel computation unit 322 then calculates:

$$Nw = \mathrm{INT}\{(Iok-a)/Iw\} \quad \text{(Eq. 2); and}$$

$$Nr = \mathrm{INT}\{(Iok-a)/Ir\} \quad \text{(Eq. 3).}$$

Here, INT(A) indicates the largest integer no larger than A. At this point, if Nw>N, then the parallel computation unit 322 sets Nw=N. If Nr>N, Nr=N.

If Iok≧Imax, Nw=Nr=N.

Subsequently, the parallel computation unit 322 stores therein the calculated parallel write count Nw and parallel read count Nr, and outputs to the command execution unit 321 a computation end signal indicating that the computation is properly finished.

(7-2) Memory Number Computation Unit 323

The memory number computation unit 323 prestores therein the number of flash memories provided in the memory card 300—N=4. In addition, the memory number computation unit 323 manages correspondence between memory addresses that are actual addresses of sectors in the flash memories 310 to 313 and sector numbers output by the external apparatus.

The memory number computation unit 323 receives the start sector number and the number of sectors from the command execution unit 321, and is directed to calculate writing-destination memory numbers or reading-destination memory numbers.

Directed to calculate writing-destination memory numbers or reading-destination memory numbers, the memory number computation unit 323 generates a memory table 324 shown in FIG. 6, and temporarily stores therein the generated memory table 324.

The memory table 324 comprises one or more memory information sets 326, 327 . . . . Each memory information set is constituted with a sector number, a memory number and a memory address. A sector number is a logical address of a sector specified by the external apparatus for data writing or reading. Each memory number corresponds to a flash memory for data writing or reading, and the memory numbers "0", "1", "2" and "3" indicate the flash memories 310, 311, 312 and 313, respectively. A memory address is a physical address of a sector of a flash memory.

Specifically speaking, the memory table 324 is generated according to the following computation.

Directed to calculate writing-destination memory numbers, the memory number computation unit 323 calculates a sector number and a memory number according to the following (Eq. 4) and (Eq. 5), based on the received start sector number and number of sectors;

$$\text{Sector Number} = \text{Start Sector Number} + t \quad \text{(Eq. 4); and}$$

$$\text{Memory Number} = (\text{Sector Number})\% N \quad \text{(Eq. 5).}$$

Here, a variable t is an integer no less than 0 and its initial value is 0.

The memory number computation unit 323 then specifies a memory address of a sector for data writing or reading, and thus generates a memory information set. Next, the memory number computation unit 323 adds one to the variable t. In a similar fashion, the memory number computation unit 323 repeats the calculation of sector number, calculation of a memory number, specification of a memory address and increment of the variable t until the variable t matches the received number of sectors, and thereby generates as many memory information sets as the received number of sectors.

The memory table 324 shown in FIG. 6 is an example of a memory table generated by the memory number computation unit 323 in the case where the memory number computation unit 323 received the start sector number "3" and the number of sectors "4". The memory information set 326 shows that a sector identified with the sector number "3" is made to correspond with a sector having a memory address "AAAA" in the flash memory 313 corresponding to the memory number "3".

Next, the memory number computation unit 321 outputs a computation end signal indicating that the computation of memory numbers is completed.

(7-3) Command Execution Unit 321

The command execution unit 321 is, as shown in FIG. 6, connected to each circuit constituting the parallel control unit 304 as well as to the memory control units 330 to 333, and controls operations of these individual circuits.

The command execution unit 321 receives commands analyzed by the command analysis unit 303, and performs, according to each of the received commands, initialization, a writing process or a reading process described hereinafter.

<Initialization>

Receiving a request for the maximum current consumption value Imax via the command analysis unit 303, the command execution unit 321 directs the parallel computation unit 322 to calculate the maximum current consumption value Imax. Receiving the maximum current value Imax from the parallel computation unit 322, the command execution unit 321 outputs the received maximum current consumption value Imax to an external apparatus via the external IF unit 301. Here, the external apparatus is the PC 100 or the video camera 200.

The command execution unit 321 receives the available supply current value Iok from the external apparatus via the external IF unit 301 and command analysis unit 303. Receiving the available supply current value Iok, the command execution unit 321 outputs the received available supply current value Iok to the parallel computation unit 322, and directs the parallel computation unit 322 to calculate the parallel write count Nw and the number of parallel read operations Nr. The command execution unit 321 next receives a computation end signal indicating that the computation is finished properly, and outputs an Ack signal to the external apparatus via the external IF unit 301.

<Writing Process>

Receiving a write command via the command analysis unit 303, the command execution unit 321 checks whether at least one of the four storage areas of the buffer memory 309 is free, and judges whether one data block can be written thereto. When one or more storage areas are free, the command execution unit 321 judges that data writing is possible, and outputs to the external apparatus via the external IF unit 301 a response indicating that writing one data block is possible. If judging that data writing is not possible, the command execution unit 321 waits ready until any of the storage areas becomes available.

After outputting the response, the command execution unit 321 performs: (a) data block reception control; and (b) data writing control, described below.

(a) Data Block Reception Control

After the external apparatus has written one data block into the buffer memory 309, the command execution unit 321 receives from the buffer memory 309 an OK signal indicating that writing one data block is finished.

After receiving the OK signal, the command execution unit 321 checks whether there is a free storage area available in the buffer memory 309 once again and judges whether a data block can be written thereto. If data writing is not possible, the command execution unit 321 waits ready until data writing will be allowed. When data writing becomes possible, the command execution unit 321 outputs to the external apparatus via the external IF unit 301 a response indicating that writing one data block is possible.

(b) Data Writing Control

The command execution unit 321 reads the parallel write count Nw stored in the parallel computation unit 322. Next, the command execution unit 321 outputs the start sector number and the number of sectors included in a write command to the memory number computation unit 323, and directs the memory number computation unit 323 to calculate writing-destination memory numbers.

The command execution unit 321 receives a computation end signal from the memory number computation unit 323. The command execution unit 321 subsequently selects Nw pieces of memory information sets starting with the first set of the memory table 324 in the memory number computation unit 323, extracts memory numbers and memory addresses from the selected memory information sets, and outputs to individual memory control units corresponding to the extracted memory numbers, an extracted memory address and a write direction indicating data writing.

Assume a specific example where the start sector number is "3", the number of sectors is "4" and the parallel write count Nw is "2". The command execution unit 321 extracts a memory number and a memory address from each of the memory information sets 326 and 327. The command execution unit 321 then outputs a write direction and a memory address "AAAA" to the memory control unit 333, which controls the flash memory 313 corresponding to the memory number "3", while outputting a write direction and a memory address "BBBB" to the memory control unit 330, which controls the flash memory 310 corresponding to the memory number "0".

Next, the command execution unit 321 receives from one of the memory control units 333 and 330 an end signal indicating that writing one data block is finished. Up to this point, the command execution unit 321 has finished directing each of the memory control units 333 and 330 to write a data block to their corresponding flash memories 313 and 310—namely, write operations for only two data blocks, in total, have been directed so far. Thus, since having not finished to direct write operations for as many data blocks as the number of sectors "4" in the received write command, the command execution unit 321 moves on to the next memory information set 328 in the memory table 324 and extracts a memory number "1" and a memory address "CCCC" therefrom. Then, the command execution unit 321 outputs a write direction and the memory address "CCCC" to the memory control unit 331, which corresponds to the extracted memory number "1".

In like fashion, the command execution unit 321 outputs a write direction and a memory address "DDDD" to the memory control unit 332 corresponding to a memory number "2".

After having directed write operations for four data blocks, which match the received number of sectors "4", the command execution unit 321 finishes the control of data writing to the flash memories.

<Reading Process>

Receiving via the command analysis unit 303 a read command indicating data reading, the command execution unit 321 performs: (a) data reading control; and (b) data block output control, described below.

(a) Data Reading Control

The command execution unit 321 outputs to the memory number computation unit 323 the start sector number and the number of sectors included in the read command, and directs the memory number computation unit 323 to calculate reading-destination memory numbers.

The command execution unit 321 next receives a computation end signal from the memory number computation unit 323, and reads the parallel read count Nr stored in the parallel computation unit 322.

Then, the command execution unit 321 outputs the calculated memory numbers indicating flash memories for data reading to corresponding memory control units, in a similar procedure described in (b) data writing control of the writing process. Note that, in the data reading control, the command execution unit 321 uses the parallel read count Nr instead of the parallel write count Nw, and outputs a read direction indicating data reading, instead of a write direction.

The command execution unit 321 next receives from one of the memory control units an end signal indicating that reading one data block has been finished. Up to this point, if having already output directions for reading as many data blocks as the number of sectors included in the received read command, the command execution unit 321 finishes the data reading control.

When having not yet output directions for reading as many data blocks as the number of sectors, the command execution unit 321 outputs a read direction to a memory control unit corresponding to a memory number included in the next memory information set.

(b) Data Block Output Control

Receiving a read command, the command execution unit 321 checks data stored in the buffer memory 309, and judges whether one data block can be output therefrom. That is, the command execution unit 321 checks whether one or more data blocks have been transferred to the buffer memory 309 from flash memories.

If determining that the output is not possible, the command execution unit 321 waits ready until transferring one data block from one of the flash memories to the buffer memory 309 is completed.

If determining that the output is possible, the command execution unit 321 outputs to the external apparatus via the external IF unit 301 a response indicating that outputting a data block is possible.

Subsequently, the command execution unit 321 directs the buffer memory 309 to output one data block. The command execution unit 321 then receives from the buffer memory 309 an OK signal indicating that the output of the data block is finished properly. Receiving the OK signal, the command execution unit 321 checks data stored in the buffer memory 309 once again, and judges whether outputting another data block is possible.

From then on until outputting as many data blocks as the number of sectors included in the received read command, the command execution unit 321 repeats: making a judgement of whether outputting one data block is possible; outputting a response; and outputting one data block.

1.4 Operations of Memory Card 300 and PC 100

Here is explained a case in which the memory card 300 is attached to the PC 100, although the memory card 300 can also be attached to the video camera 200.

(1) Operations Taken When Memory Card 300 is Attached

Figure 7:
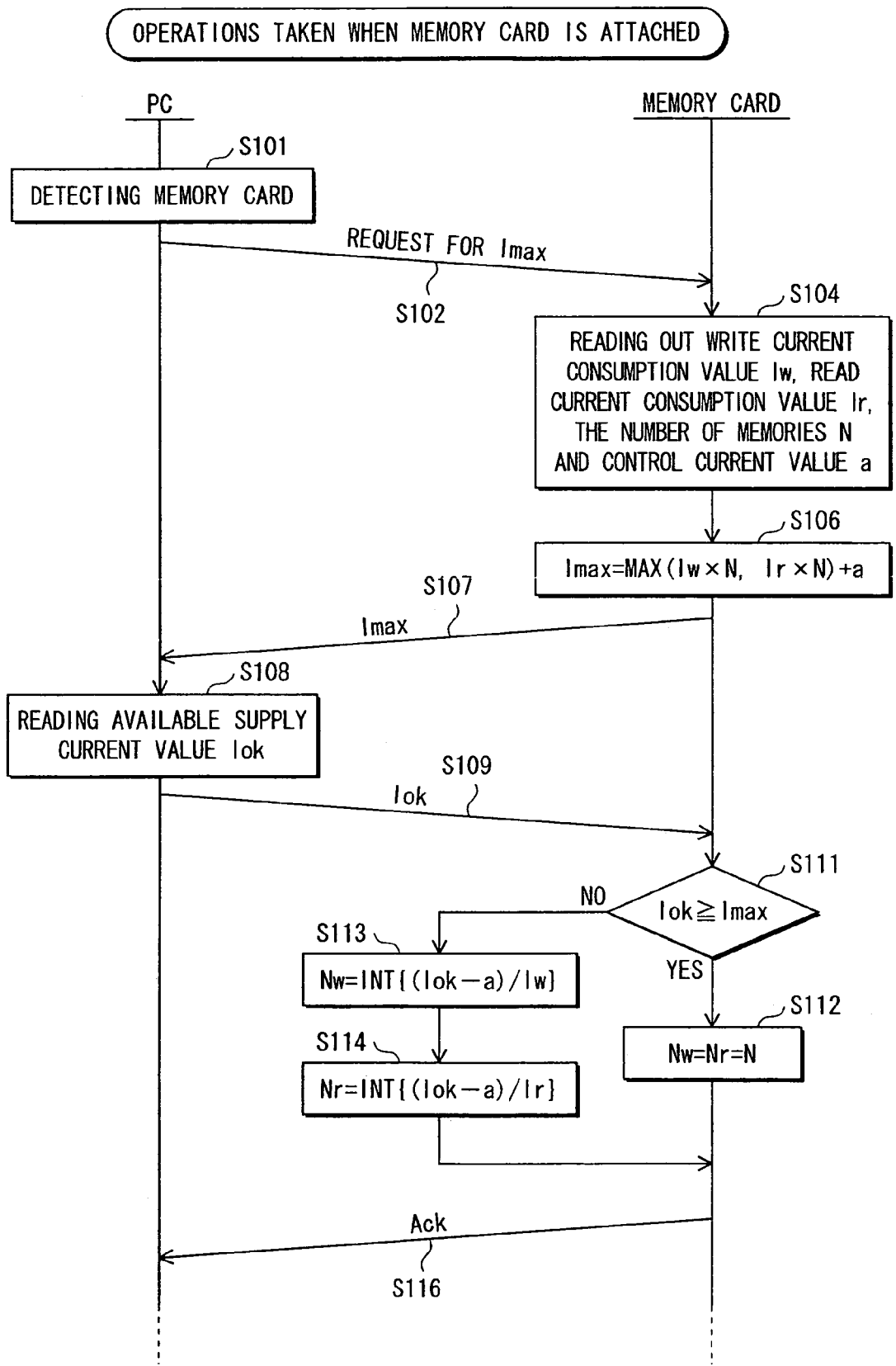
FIG. 7 is a flowchart showing operations of the memory card 300 and PC 100 when the memory card 300 is placed in the PC 100.

Operations of the PC 100 and memory card 300 right after the memory card 300 is attached to the PC 100 are described next with the aid of a flowchart of FIG. 7.

The PC 100 detects via the external IF unit 101 the memory card 300 being placed therein (Step S101). Next, the PC 100 requests the memory card 300 for the maximum current consumption value Imax via the external IF unit 101 (Step S102).

The memory card 300 receives the request for the maximum current consumption value Imax from the PC 100 via the external IF unit 301. Receiving the request for the maximum current consumption value Imax, the memory card 300 reads out from the control information storage unit 308 the write current consumption value Iw, the read current consumption value Ir, the number of memories N and the control current value a (Step S104). The memory card 300 next calculates the maximum current consumption value Imax based on the readout write current consumption value Iw, read current consumption value Ir, number of memories N and control current value a (Step S106), and outputs the calculated maximum current consumption value Imax to the PC 100 (Step S107).

The PC 100 receives the maximum current consumption value Imax from the memory card 300. Receiving the maximum current consumption value Imax, the PC 100 reads out the available supply current value Iok from the available supply current value storage unit 110 (Step S108), and outputs the readout available supply current value Iok to the memory card 300 (Step S109).

The memory card 300 receives the available supply current value Iok from the PC 100 via the external IF unit 301, and compares the received available supply current value Iok with the calculated maximum current consumption value Imax (Step S111). If Iok≧Imax (Step S111: YES), then the memory card 300 sets the parallel write count Nw=the parallel read count Nr=the number of memories N (Step S112).

If Iok<Imax (Step S111: NO), the memory card 300 calculates Nw=INT{(Iok−a)/Iw} (Step S113), calculates Nr=INT{(Iok−a)/Ir} (Step S114), and stores therein the calculated parallel write count Nw and parallel read count Nr. Subsequently, the memory card 300 outputs an Ack signal to the PC 100 (Step S116).

(2) Operations for Writing to Memory Card 300

Figure 8:
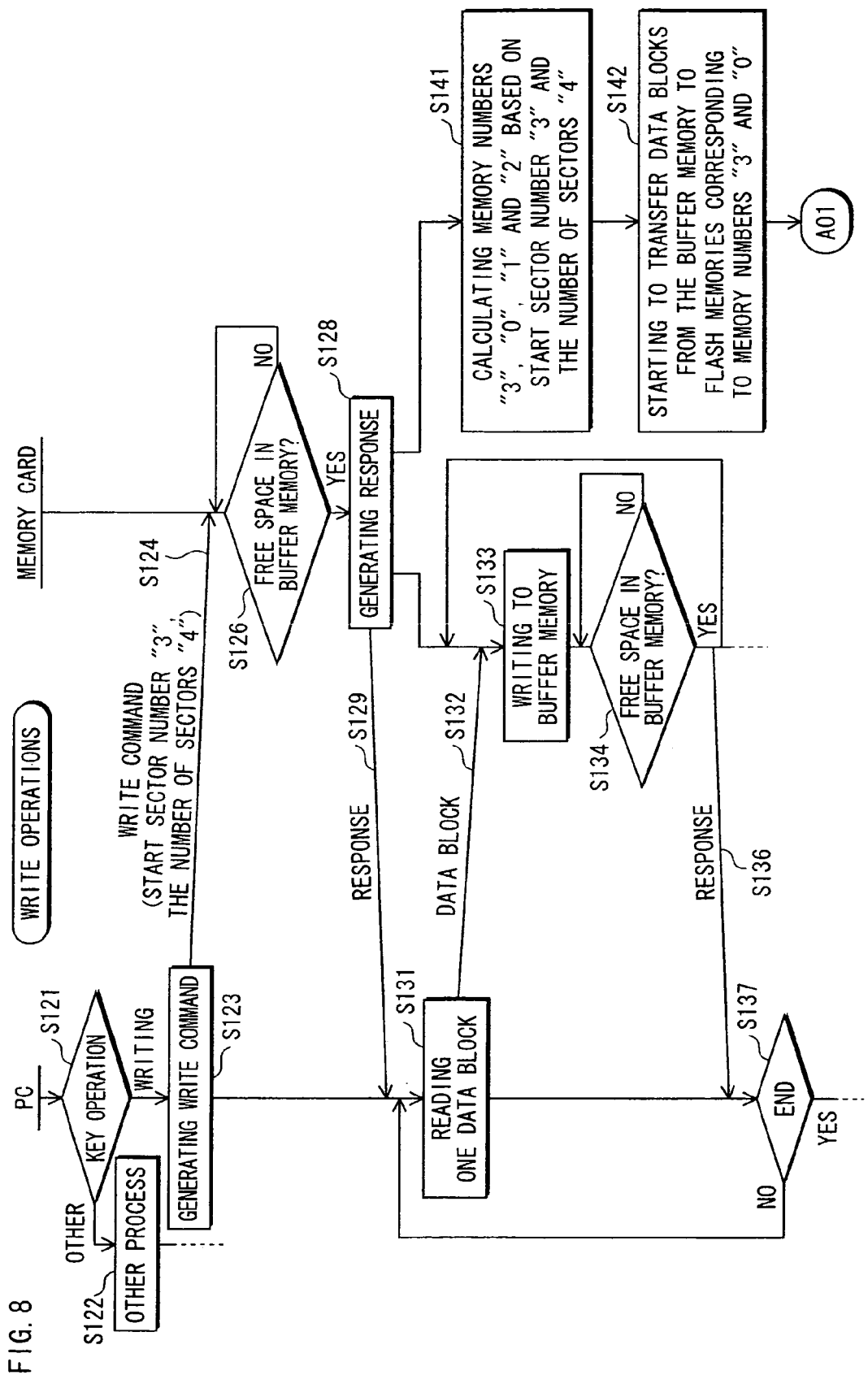
FIG. 8 is a flowchart showing data write operations of the memory card 300 and PC 100.
Figure 9:
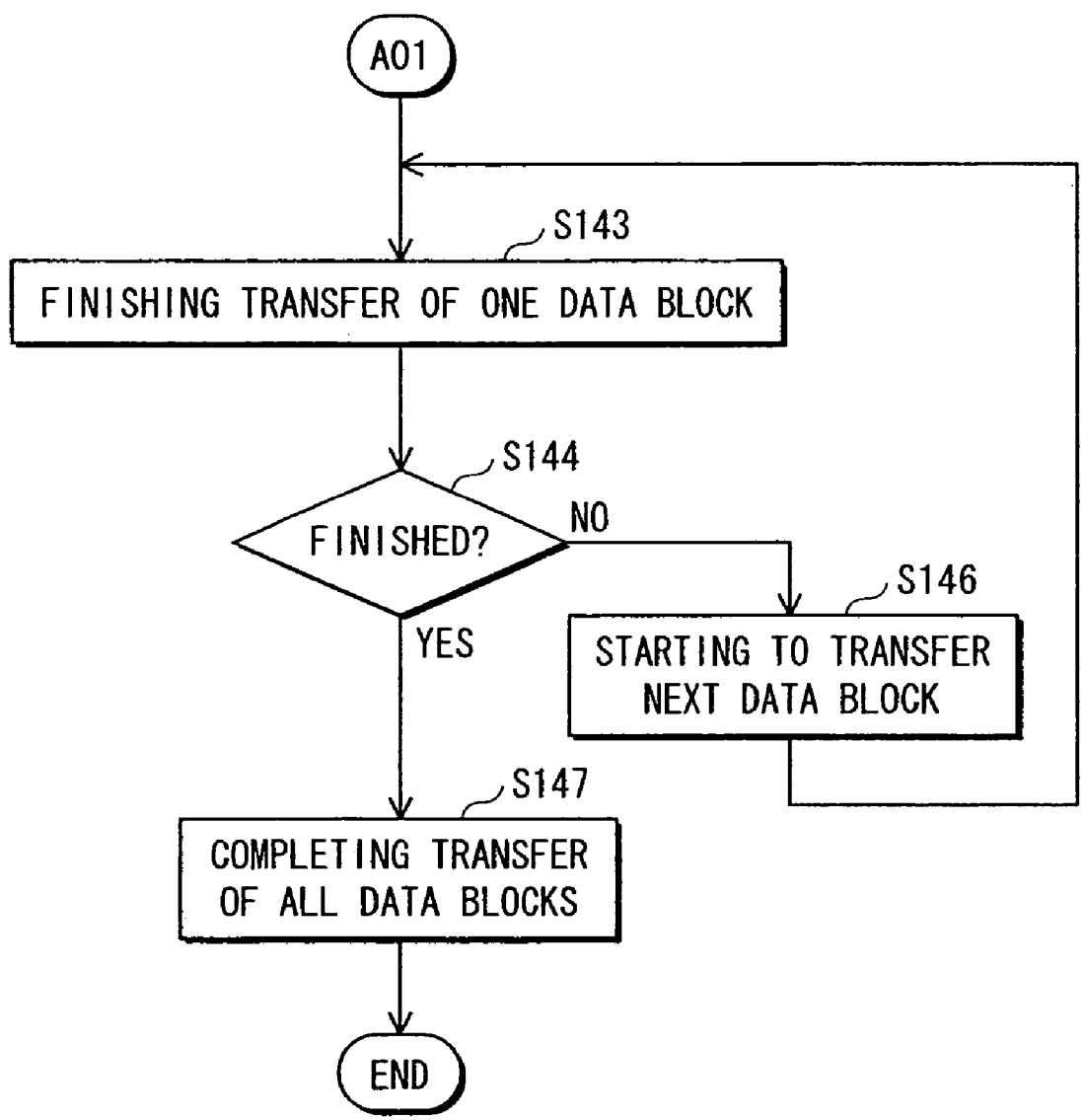
FIG. 9 is another flowchart showing data write operations of the memory card 300 and PC 100 (continued from FIG. 8)

Operations for writing data to the memory card 300 are described next with the aid of a flowchart of FIG. 8. The description here is given based on a specific case where the parallel write count Nw is "2", the start sector number is "3" and the number of sectors is "4".

The PC 100 receives a key operation of the user (Step S121). When the received key operation is one indicating data writing to the memory card 300, the PC 100 generates a write command including the start sector number "3" and the number of sectors "4" (Step S123), and outputs the generated write command to the memory card 300 (Step S124).

The memory card 300 receives the write command from the PC 100, checks free space of the buffer memory 309, and judges whether writing one data block is possible (Step S126). If determining that the writing is not possible (Step S126: NO), the memory card 300 waits ready until free space becomes available in the buffer memory 309 for writing one data block.

If determining that the writing is possible (Step S126: YES), the memory card 300 generates a response indicating that the data writing is possible (Step S128) and outputs the generated response to the PC 100 (Step S129).

The PC 100 receives the response from the memory card 300 (Step S129). Receiving the response, the PC 100 reads one data block out of the data to be output (Step S131) and outputs the read data block to the memory card 300 (Step S132).

The memory card 300 receives the data block from the PC 100, and writes the received data block to the buffer memory 309 (Step S133). When having finished to write the data block to the buffer memory 309, the memory card 300 checks free space of the buffer memory 309 once again, and judges whether writing thereto one data block is possible (Step S134). If determining that the writing is not possible (Step S134: NO), the memory card 300 waits ready until free space becomes available in the buffer memory 309 for writing one data block.

If determining that the writing is possible (Step S134: YES), the memory card 300 outputs to the PC 100 a response indicating that writing one data block is possible. In a similar fashion, each time when receiving a data block from the PC 100, the memory card 300 repeats Steps S133 to S136.

The PC 100 receives the response from the memory card 300 (Step S136). Up to this point, if the PC has not yet output all data blocks making up the data which will be written to the memory card 300 (Step S134: NO), the process returns to Step S129 and the next data block is output.

In addition, the memory card 300 performs Steps S141 to S147—data transfer from the buffer memory 309 to each flash memory, in parallel with Step S133 to S136.

First, the memory card 300 calculates the memory numbers "3", "0", "1" and "2" each indicating a flash memory for writing data blocks based on the start sector number "3" and the number of sectors "4" included in the received write command, and generates the memory table 324 (Step S141). Since Nw=2, the memory card 300 outputs a write direction to each of the memory control units 333 and 330 corresponding to the memory numbers "3" and "0", respectively, and starts transferring data blocks from the buffer memory 309 to the flash memories 313 and 310 (Step S142).

The data block transfer to either one of the flash memories finishes (Step S143). At this point, the memory card 300 has not yet finished to direct memory control units to transfer as many data blocks as the received number of sectors "4" (Step S144: NO). Therefore, the memory card 300 reads out the next memory number and memory address—specifically speaking, the memory number "1" and memory address "CCCC"—from the memory table 324. Then, the memory card 300 outputs the memory address "CCCC" and a write direction to the memory control unit 331 which corresponds to the readout memory number "1", and the memory control unit 331 starts transferring a data block to the flash memory 311 (Step S146).

The memory card 300 repeats Steps S143 to S146, and starts transferring a data block to the flash memory 312 indicated by the memory number "2".

Next, in Step S144, the memory card 300 determines to have finished directing the memory control units to transfer a total of four data blocks to the flash memories (Step S144: YES). When transfer of all these data blocks to the flash memories is completed (Step S147), the write operations are finished.

(3) Time Chart of Write Operations

Figure 10:
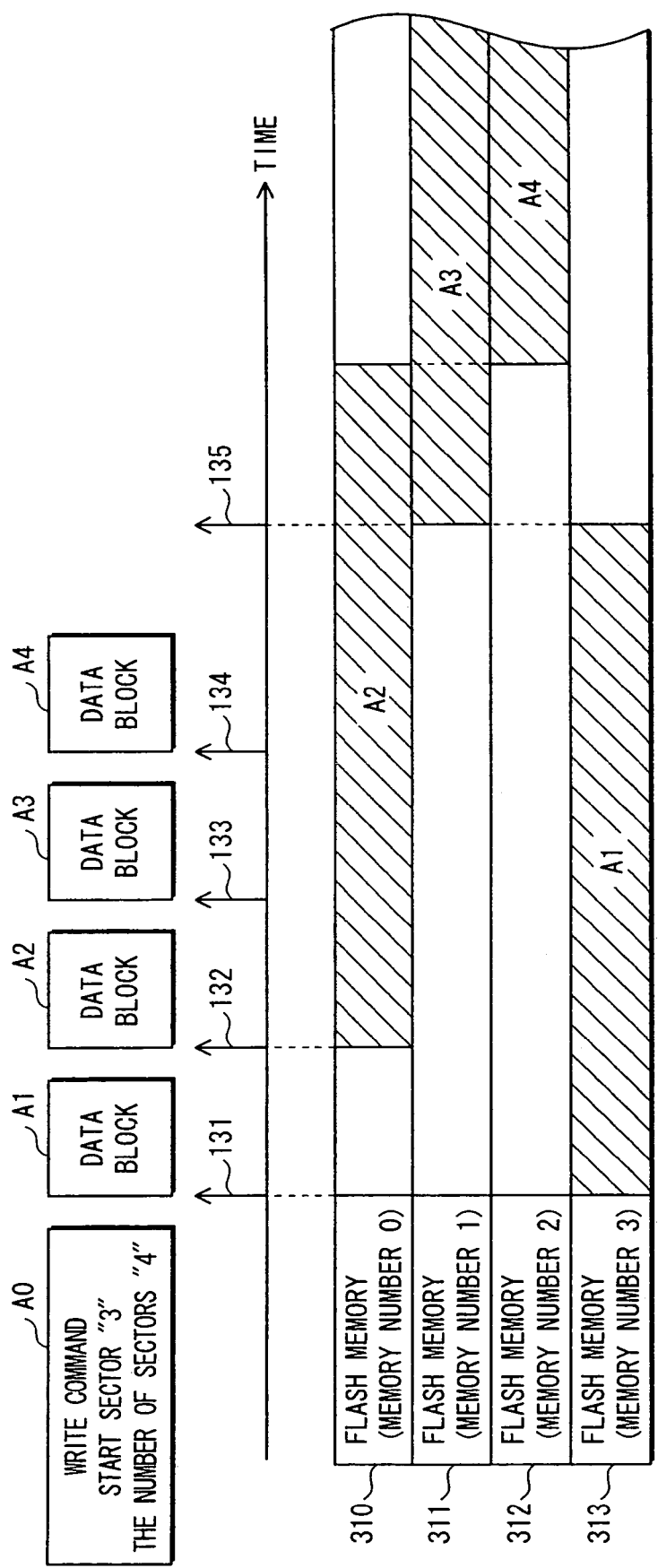
FIG. 10 is a time chart showing operations of respective flash memories when data is written to the memory card 300.

Next are described timings of giving and receiving commands and data between the memory card 300 and the PC 100 and operation timings of the flash memories 310 to 313 when data is written to the memory card 300, with the aid of a time chart shown in FIG. 10. Assume here that the parallel write count Nw=2, and all four storage areas of the buffer memory 309 are free at the time of the reception of a write command.

In FIG. 10, a command and data blocks that the memory card 300 receives from the PC 100 and responses output from the memory card 300 to the PC 100 are depicted along the time course of the write operations, and the horizontal axis represents time. In addition, the figure shows operating conditions of the flash memories 310 to 313 at each instant of time.

The memory card 300 receives a write command A0 from the PC 100. The write command A0 includes the start sector number "3" and the number of sectors "4".

The memory card 300 checks free space of the buffer memory 309, and outputs to the PC 100 a response 131 indicating that writing a data block of 512 bytes thereto is possible. Receiving the response 131, the PC 100 outputs a data block A1 to the memory card 300.

At the same time, the memory card 300 starts transferring the data block A1 from the buffer memory 309 to the flash memory 313. When the output of the data block A1 from the PC 100 to the memory card 300 is finished, the memory card 300 checks free space of the buffer memory 309 once again, and outputs to PC 100 a response 132 indicating that writing a data block thereto is possible.

Receiving the response 132, the PC 100 outputs a data block A2 to the memory card 300.

At the same time, the memory card 300 starts transferring the data block A2 from the buffer memory 309 to the flash memory 310.

When the output of the data block A2 from the PC 100 to the memory card 300 is finished, the memory card 300 checks free space of the buffer memory 309 once again, and outputs to PC 100 a response 133 indicating that writing a data block thereto is possible.

In like fashion, receiving the response 133, the PC 100 outputs a data block A3 to the memory card 300. Here, since the parallel write count Nw is two and thus the flash memories 313 and 310 are operating, the rest of the flash memories do not operate until the transfer to either of the flash memories 313 and 310 is finished.

The output of the data block A3 from the PC 100 to the memory card 300 is finished. The memory card 300 checks free space of the buffer memory 309 once again, and outputs to the PC 100 a response 134 indicating that writing a data block thereto is possible.

Receiving the response 134, the PC 100 outputs the data block A4 to the memory card 300.

The data blocks A1 to A4 are now stored in the buffer memory 309, and no new data block can be written thereto. At the point when the writing of the data block A1 is finished in the flash memory 313, which is the first flash memory having started receiving the data block transfer, writing a new data block to the buffer memory 309 becomes possible. The memory card 300 then outputs to the PC 100 a response 135 indicating that writing a data block thereto is possible.

At the same time, the memory card 300 starts transferring the data block A3 from the buffer memory 309 to the flash memory 311. When the transfer of the data block A2 to the flash memory 310 is finished, the memory card 300 subsequently starts transferring the data block A4 from the buffer memory 309 to the flash memory 312.

1.5 Summary and Advantageous Effects

As has been described above, the memory card 300 obtains, when connected to an external apparatus, the available supply current value of the external apparatus, and calculates the parallel write count Nw and the parallel read count Nr in order to keep the current consumption value of the memory card 300 to no more than the obtained available supply current value.

When receiving a write command from the external apparatus, the memory card 300 performs a writing process by operating Nw pieces of flash memories in parallel. When receiving a read command from the external apparatus, the memory card 300 performs a reading process by operating Nr pieces of flash memories in parallel.

Advantageous effects of the present invention are illustrated next, using specific numerical values.

Assume that the write current consumption value Iw=100 mA; the read current consumption value Ir=50 mA; the number of memories N=4; the control current value a=100 mA; and the writing and reading speed of the respective flash memories 310 to 313 is 4 MB/s.

Receiving the available supply current value Iok=350 mA from the PC 100, the memory card 300 calculates Nw and Nr using (Eq. 2) and (Eq. 3):

$$Nw=\text{INT}\{(350-100)/100\}=2;\text{ and}$$

$$Nr=\text{INT}\{(350-100)/50\}=5.$$

Since Nr>N here, Nr=N=4.

In the case with the above assumed numerical values, the current consumption values of the memory card 300 during the writing operations and during the reading operations are 300 mA and 350 mA, respectively, both of which are no greater than the available supply current value, 350 mA.

The writing speed of the memory card 300 in this case is 8 MB/s since two flash memories can be operated in parallel, and thus a two-fold faster writing speed can be achieved as compared to the case where no parallel operations take place. On the other hand, the reading speed is 16 MB/s since four flash memories can be operated in parallel. As a result, four times faster reading is accomplished when compared to the case where no parallel operations are performed.

Herewith, a large increase in both reading and writing speeds can be efficiently realized within the power supply capacity of the PC 100.

2. Embodiment 2

Next is described a memory card 600 of Embodiment 2 according to the present invention.

The memory card 600 is set in the PC 100 or the video camera 200, as in the case of the memory card 300 of Embodiment 1. Since the structure and operations of the PC 100 and video camera 200 are the same as in the case of Embodiment 1, their descriptions are omitted here.

The memory card 600 is equipped with four flash memories. The memory card 600 receives the available supply current value from an external apparatus—specifically speaking, the PC 100 or the video camera 200, and calculates the operating frequency of the flash memories in order to keep the current consumption value of the memory card 600 to no more than the received available supply current value. Receiving a command from the external apparatus, the memory card 600 operates the flash memories at the calculated operating frequency.

2.1 Memory Card 600

Figure 11:
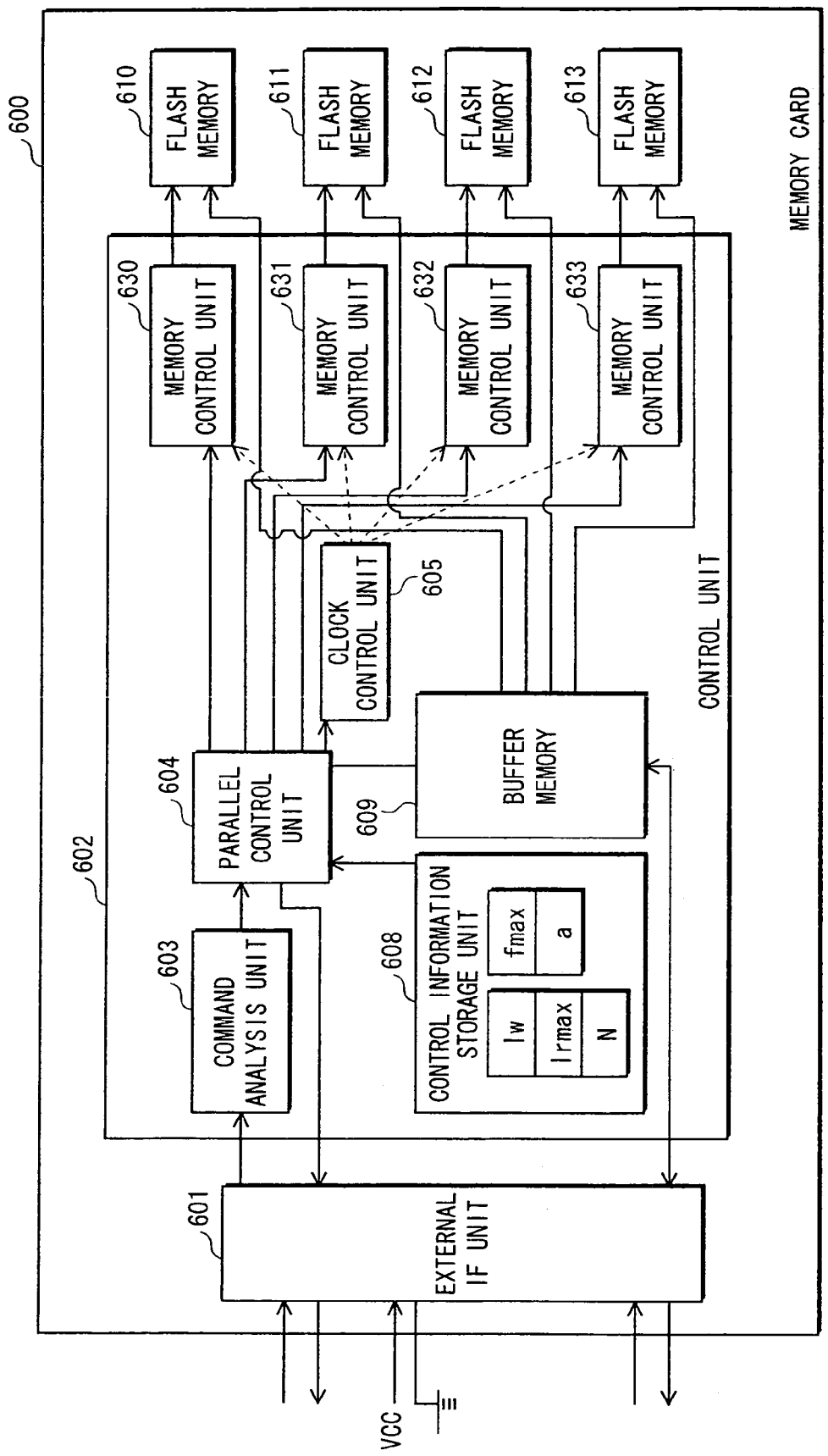
FIG. 11 is a block diagram showing a structure of a memory card 600 according to Embodiment 2.

The memory card 600 comprises, as shown in FIG. 11: an external IF unit 601; a control unit 602; flash memories 610, 611, 612 and 613.

The control unit 602 includes: a command analysis unit 603; a parallel control unit 604; a clock control unit 605; memory control units 630, 631, 632 and 633; a control information storage unit 608; and a buffer memory 609.

The control unit 602 is made up of, concretely speaking, a microprocessor, a RAM and a ROM. Computer programs are stored in the RAM and ROM. The microprocessor operates according to the computer programs, and thereby the control unit 602 fulfills its function.

The structures and operations of the external IF unit 601, command analysis unit 603, memory control units 630, 631, 632 and 633, buffer memory 609, and flash memories 610, 611, 612 and 613 are the same as those of the counterparts in Embodiment 1—i.e. the external IF unit 301; the command analysis unit 303; the memory control units 330, 331, 332 and 333; the buffer memory 309; and the flash memories 310, 311, 312 and 313. Accordingly, their explanations are left out here, and the following description focuses only on features of the present embodiment, the parallel control unit 604, the clock control unit 605 and the control information storage unit 608.

(1) Control Information Storage Unit 608

The control information storage unit 608 is constituted with a ROM, and stores therein a write current consumption value Iw, a maximum read current consumption value Irmax, the number of memories N, a maximum frequency fmax and a control current value a, as shown in FIG. 11.

The write current consumption value Iw, the number of memories N and control current value a are the same as those in Embodiment 1.

The maximum frequency fmax is an operating frequency of each flash memory in the memory card 600 when the flash memories operate data reading at the maximum reading speed.

The maximum read current consumption value Irmax is the amount of the current consumed by one flash memory and its corresponding memory control unit when the flash memory operates data reading at the maximum reading speed, i.e. at the maximum frequency fmax.

(2) Clock Control Unit 605

The clock control unit 605 is equipped with a PLL (Phase Lock Loop). The clock control unit 605 generates a clock signal at predetermined time intervals, and outputs the generated clock signal to each unit constituting the memory card 600. The frequency of the clock signal that the clock control unit 605 supplies to the flash memories 610 to 613 via the memory control units 630 to 633 is generally the maximum frequency fmax. When the frequency of the clock signal is the maximum frequency fmax, the operating frequencies of the memory control units 630 to 633 and flash memories 610 to 613 are also fmax.

The clock control unit 605 receives from the parallel control unit 604 a frequency change direction and a reading frequency fr. The reading frequency fr is an upper limit of the operating frequencies of the flash memories 610 to 613 for keeping the amount of the current consumed by the memory card 600 to no more than the available supply current value Iok when the flash memories 610 to 613 are operating data reading in parallel.

Receiving a frequency change direction, the clock control unit 605 changes the frequency of the clock signal to be supplied to the memory control units 630 to 633 into the received reading frequency fr, using the PLL.

When receiving a change ending direction from the parallel control unit 604, the clock control unit 605 changes the frequency of the clock signal to be supplied to the flash memories 610 to 613 back to the normal, maximum frequency fmax from the reading frequency fr.

(3) Parallel Control Unit 604

Figure 12:
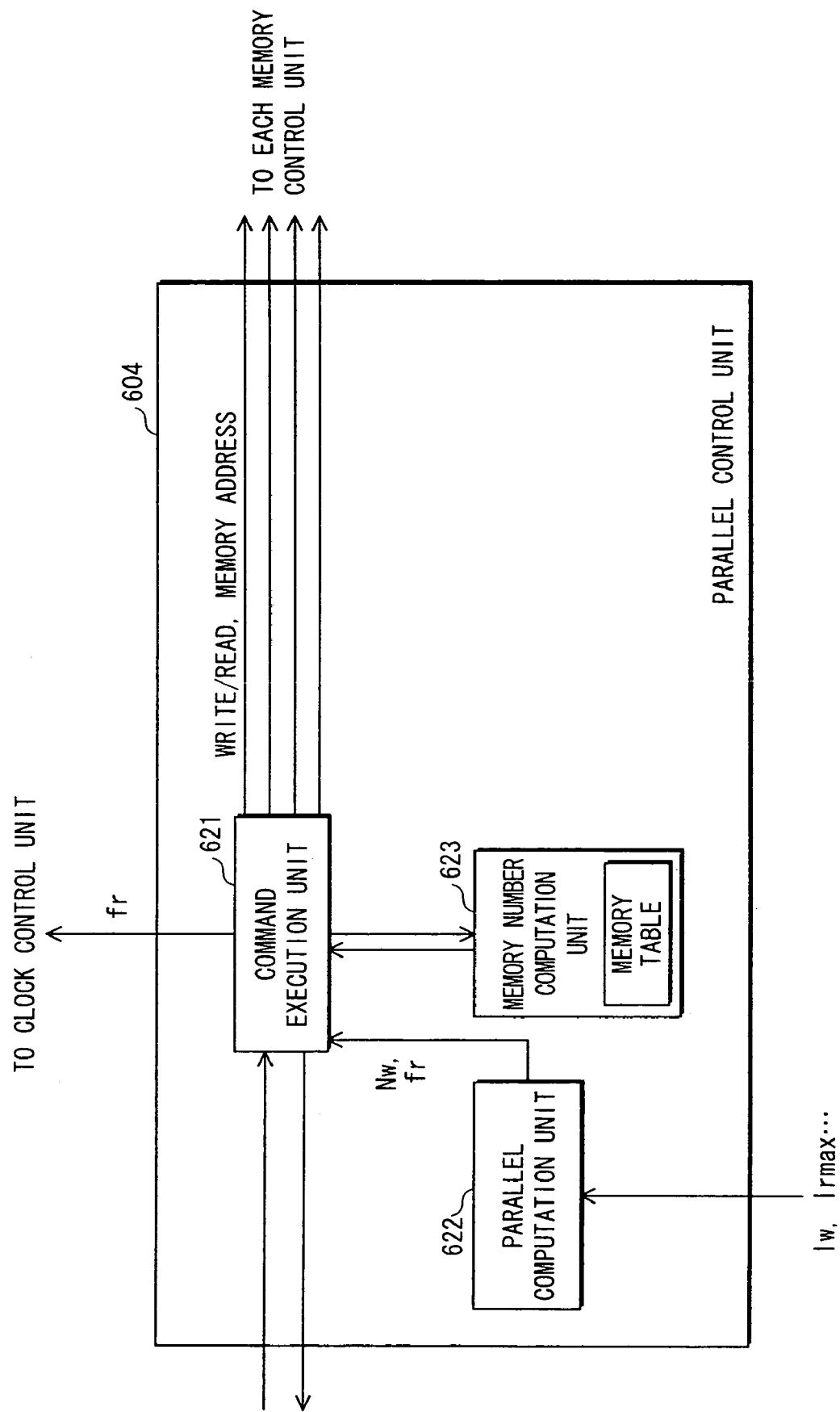
FIG. 12 is a block diagram showing a structure of a parallel control unit 604.

The parallel control unit 604 comprises, as shown in FIG. 12: a command execution unit 621; a parallel computation unit 622; and a memory number computation unit 623.

The memory number computation unit 623 is the same as the counterpart of Embodiment 1, and therefore the following describes only features of the present embodiment, the command execution unit 621 and the parallel computation unit 622.

(3-1) Parallel Computation Unit 622

The parallel computation unit 622 is directed by the command execution unit 621 to calculate the maximum current consumption value Imax. Additionally, the parallel computation unit 622 receives the available supply current value Iok from the command execution unit 621, and is directed to calculate the parallel write count Nw and the reading frequency fr.

Directed to calculate the maximum current consumption value Imax, the parallel computation unit 622 reads out from the control information storage unit 608 the write current consumption value Iw, the maximum read current consumption value Irmax, the number of memories N and the control current value a. The parallel computation unit 622 calculates the maximum current consumption value Imax based on the readout write current consumption value Iw, read current consumption value Ir, number of memories N and control current value a:

$$Imax = Max(N \times Iw, N \times Irmax) + a \quad \text{(Eq. 6)}.$$

The parallel computation unit 622 outputs the calculated maximum current consumption value Imax to the command execution unit 621.

Directed to calculate the parallel write count Nw and the reading frequency fr, the parallel computation unit 622 reads the maximum frequency fmax from the control information storage unit 608. The parallel computation unit 622 then compares the received available supply current value Iok and the calculated maximum current value Imax. If Iok<Imax, the parallel computation unit 622 calculates:

$$Nw = INT\{(Iok-a)/Iw\} \quad \text{(Eq. 2); and}$$

$$fr = fmax \times (Iok-a)/N/Irmax \quad \text{(Eq. 7)}.$$

Here, if Nw>N, then the parallel computation unit 622 sets Nw=N, and if fr>fmax, then the parallel computation unit 622 sets fr=fmax.

If Iok≧Imax, the computation unit 622 sets Nw=N and fr=fmax.

Next, the parallel computation unit 622 stores therein the calculated parallel write count Nw and reading frequency fr, and outputs to the command execution unit 621 a computation end signal indicating that the computation is properly finished.

(3-2) Command Execution Unit 621

The command execution unit 621 prestores therein the number of flash memories provided in the memory card 600—N=4.

The command execution unit 621 receives commands analyzed by the command analysis unit 603, and performs, according to each of the received commands, initialization to be hereinafter described, a writing process or a reading process. The writing process is the same as in Embodiment 1, and therefore the description is omitted here.

<Initialization>

Requested for the maximum current consumption value Imax via the command analysis unit 603, the command execution unit 621 directs the parallel computation unit 622 to calculate the maximum current consumption value Imax. Receiving the maximum current value Imax from the parallel computation unit 622, the command execution unit 621 outputs the received maximum current consumption value Imax to an external apparatus via the external IF unit 601. Here, the external apparatus is the PC 100 or the video camera 200.

The command execution unit 621 receives the available supply current value Iok from the external apparatus via the external IF unit 601 and command analysis unit 603. Receiving the available supply current value Iok, the command execution unit 621 outputs the received available supply current value Iok to the parallel computation unit 622, and directs the parallel computation unit 622 to calculate the parallel write count Nw and the reading frequency fr.

The command execution unit 621 receives from the parallel computation unit 622 a computation end signal indicating that the computation is properly finished. Subsequently, the command execution unit 621 outputs an Ack signal to the external apparatus via the external IF unit 601.

<Reading Process>

The command execution unit 621 receives a read command indicating data reading via the command analysis unit 603. The read command includes: a start sector number that is a logical address of a sector with which the reading begins; and the number of sectors to be read. Receiving a read command, the command execution unit 621 performs: (a) read control; and (b) data block output control, described below.

(a) Read Control

The command execution unit 621 outputs to the memory number computation unit 623 the start sector number "5" and the number of sectors "4" included in the read command, and directs the memory number computation unit 623 to calculate reading-destination memory numbers. Next, the command execution unit 621 reads out the reading frequency fr from the parallel computation unit 622, and outputs the readout reading frequency fr and a frequency change direction to the clock control unit 605.

The command execution unit 621 then extracts memory numbers and memory addresses from N pieces of memory information sets in the memory table stored in the memory number computation unit 623, and outputs an extracted memory address and a read direction indicating data reading to each of the memory control units controlling flash memories identified with the extracted memory numbers.

Then, the command execution unit 621 receives from one of the memory control units an end signal indicating that the reading has been finished. Up to this point, if having not yet output to the memory control units 630 to 633 directions for reading as many data blocks as the number of sectors included in the received read command, the command execution unit 621 extracts the next memory number and memory address from the memory table, and outputs a read direction to a memory control unit corresponding to the extracted memory number. The command execution unit 621 repeats the extraction of a memory number and a memory address and the output of a read direction to a memory control unit until having output read directions for reading as many data blocks as the number of sectors.

Subsequently, the command execution unit 621 receives end signals from all memory control units to which the read directions have been output, and determines that the data reading from each flash memory has been finished. When determining that the data reading from the individual flash memories has been finished, the command execution unit 621 outputs a change ending direction to the clock control unit 605.

(b) Data Block Output Control

Receiving a read command, the command execution unit 621 checks data stored in the buffer memory 609, and judges whether one data block can be output therefrom. That is, the command execution unit 621 checks whether one or more data blocks have been transferred to the buffer memory 609 from flash memories.

If determining that the output is not possible, the command execution unit 621 waits ready until transferring one data block from one of the flash memories to the buffer memory 609 is completed.

If determining that the output is possible, the command execution unit 621 outputs to the external apparatus via the external IF unit 601 a response indicating that outputting a data block is possible.

Subsequently, the command execution unit 621 directs the buffer memory 609 to output one data block.

Until outputting to the external apparatus as many data block as the number of sectors included in the received read command, the command execution unit 621 repeats, in the same manner: making a judgement of whether outputting one data block is possible; outputting a response; and outputting one data block.

2.2 Operations of Memory Card 600 and PC 100

Figure 13:
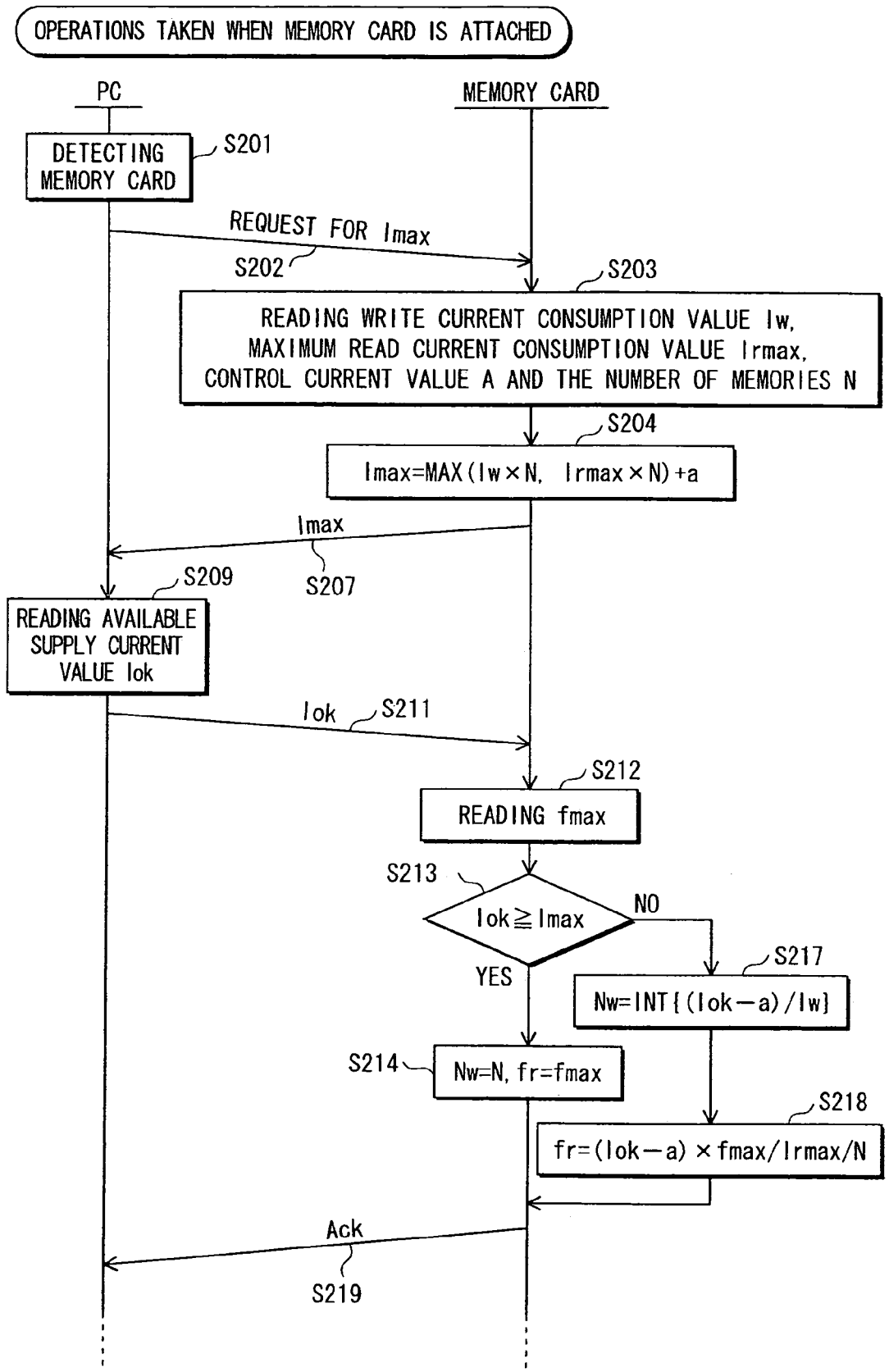
FIG. 13 is a flowchart showing operations of the memory card 600 and PC 100 when the memory card 600 is placed in the PC 100.

Here is explained a case in which the memory card 600 is attached to the PC 100, although the memory card 600 can also be attached to the video camera 200, (1) Operations Taken When Memory Card 600 is Attached Operations of the initialization when the memory card 600 is attached to the PC 100 are described next with the aid of a flowchart of FIG. 13.

The PC 100 detects via the external IF unit 101 the memory card 600 being placed therein, and implements a configuration process (Step S201). Next, the PC 100 requests the memory card 600 for the maximum current consumption value Imax (Step S202).

The memory card 600 receives the request for the maximum current consumption value Imax from the PC 100. Receiving the request for the maximum current consumption value Imax, the memory card 600 reads out from the control information storage unit 608 the write current consumption value Iw, the maximum read current consumption value Irmax, the number of memories N and the control current value a (Step S203). The memory card 600 next calculates the maximum current consumption value Imax using the readout write current consumption value Iw, maximum read current consumption value Irmax, number of memories N and control current value a (Step S204), and outputs the calculated maximum current consumption value Imax to the PC 100 (Step S207).

The PC 100 receives the maximum current consumption value Imax from the memory card 600, and reads the available supply current value Iok (Step S209). The PC 100 outputs the read available supply current value Iok to the memory card 600 via the external IF unit 101 (Step S211).

The memory card 600 receives the available supply current value Iok from the PC 100, and reads the maximum reading frequency fmax (Step S212).

Then, the memory card 600 compares the received Iok and the calculated maximum current consumption value Imax (Step S213). If Iok$\geq$Imax (Step S213: YES), the memory card 600 assigns the number of memories N to the parallel write count Nw and the maximum reading frequency fmax to the reading frequency fr (Step S214).

If Iok<Imax (Step S213: NO), the memory card 600 calculates the parallel write count Nw according to (Eq. 2) (Step S217). Here, if Nw>N, then the memory card 600 sets Nw=N. The memory card 600 subsequently calculates the reading frequency fr using (Eq. 7) (Step S218). If fr>fmax, the memory card 600 sets fr=fmax.

Then, the memory card 600 outputs to the PC 100 an Ack signal indicating that the initialization is finished properly (Step S219).

(2) Operations for Reading from Memory Card 600

Figure 14:
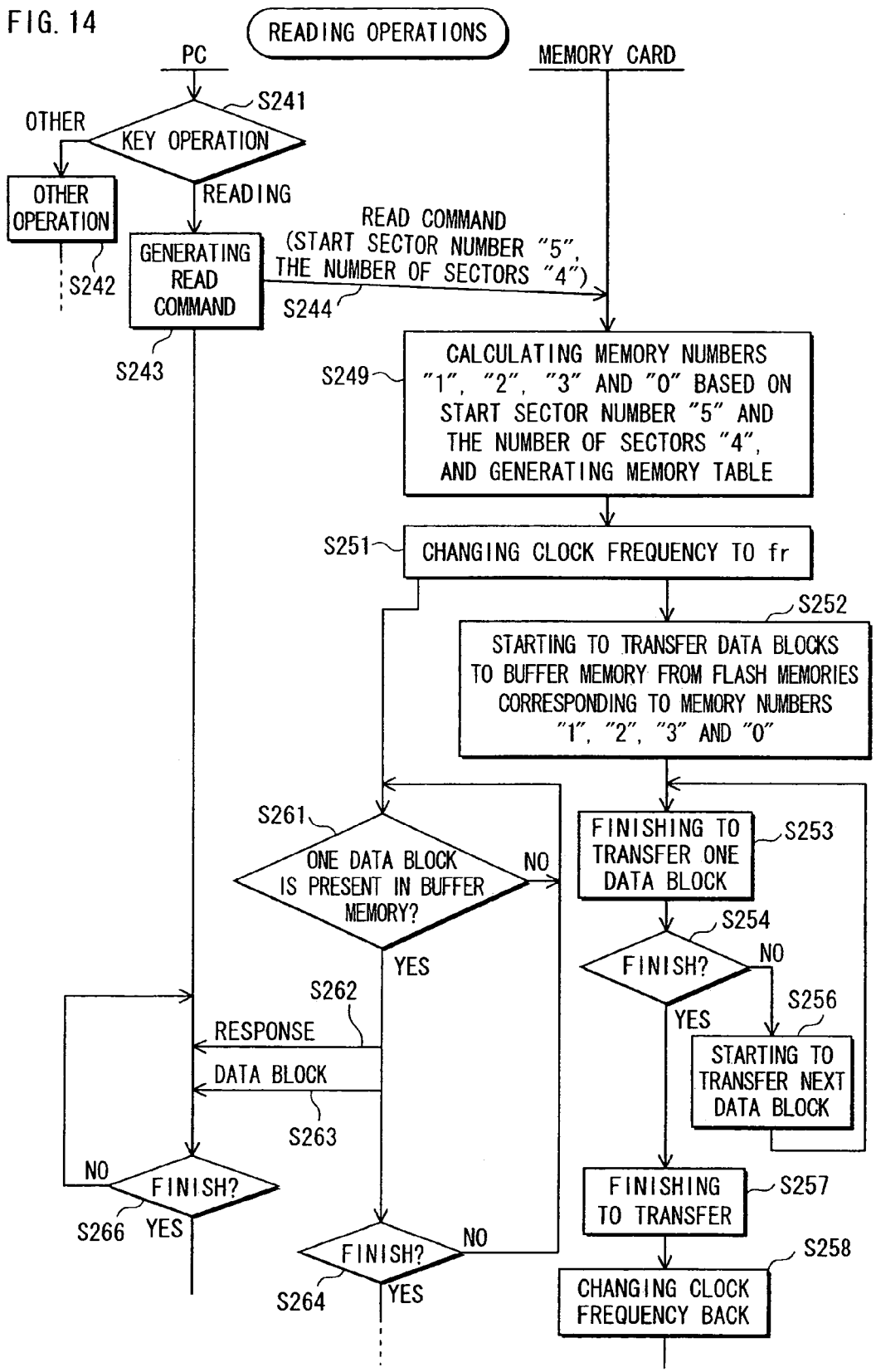
FIG. 14 is a flowchart showing data read operations of the memory card 600 and PC 100.

Operations of the memory card 600 and PC 100 when data is read from the memory card 600 are described next, with the aid of a flowchart shown in FIG. 14.

The description here is given based on a specific case where the start sector number is "5" and the number of sectors is "4".

The PC 100 receives a key operation of the user (Step S241) When the received key operation one indicating data reading from the memory card 600, the PC 100 generates a read command including the start sector number "5" and the number of sectors "4" (Step S243), and outputs the generated read command to the memory card 600 via the external IF unit 101 (Step S244).

If the received key operation indicates a process other than data reading, the PC 100 performs the process (Step S242).

Receiving the read command from the PC 100, the memory card 600 calculates the memory numbers "1", "2", "3" and "0" each indicating a flash memory for data reading, based on the start sector number "5" and the number of sectors "4," included in the received read command, and generates a memory table (Step S249).

Next, the memory card 600 changes the clock frequency which will be output to the memory control units 630 to 633 into the reading frequency fr (Step S251).

The memory card 600 extracts the memory numbers and memory addresses from N (=4) pieces of memory information sets in the memory table, and starts transferring a data block to the buffer memory 609 from each of the flash memories corresponding to the extracted memory numbers "1", "2", "3" and "0" (Step S252).

When one of the flash memories finishes the data block transfer (Step S253), if the memory card 600 has not yet finished to direct the memory control units to transfer a total of four data blocks matching the received number of sectors "4" (Step S254: NO), then the memory card 600 directs an appropriate memory control unit to read the next data block based on the memory table (Step S256).

When the memory card 600 has directed the memory control units to output four data blocks in total (Step S254: YES) and then the read operations in all flash memories have been completed (Step S257), the memory card 600 changes the clock frequency back (Step S258).

The memory card 600 performs the processing of Steps S261 to S264 in parallel with Steps S252 to S258, and outputs data blocks from the buffer memory 609 to the external apparatus.

First, the memory card 600 judges whether one or more data blocks are present in the buffer memory 609 (Step S261). If there is no data block (Step S261: NO), the memory card 600 waits ready until transferring one data block from any of the flash memories to the buffer memory 609 is completed.

If at least one data block is present (Step S261: YES), the memory card 600 outputs to the PC 100 a response indicating that outputting one data block is possible (Step S262). Subsequently, the memory card 600 outputs one data block to the PC 100 from the buffer memory 609 (Step S263). When the output is finished, the memory card 600 repeats Steps S261 to S264 until outputting to the PC 100 a total of four data blocks which matches the number of sectors "4" included in the received read command.

The PC 100 receives a response from the memory card 600 (Step S262), and subsequently receives a data block (Step S263). Until received four data blocks (Step S266: YES), the PC 100 repeats reception of a response and a data block.

(3) Time Chart of Read operations

Figure 15:
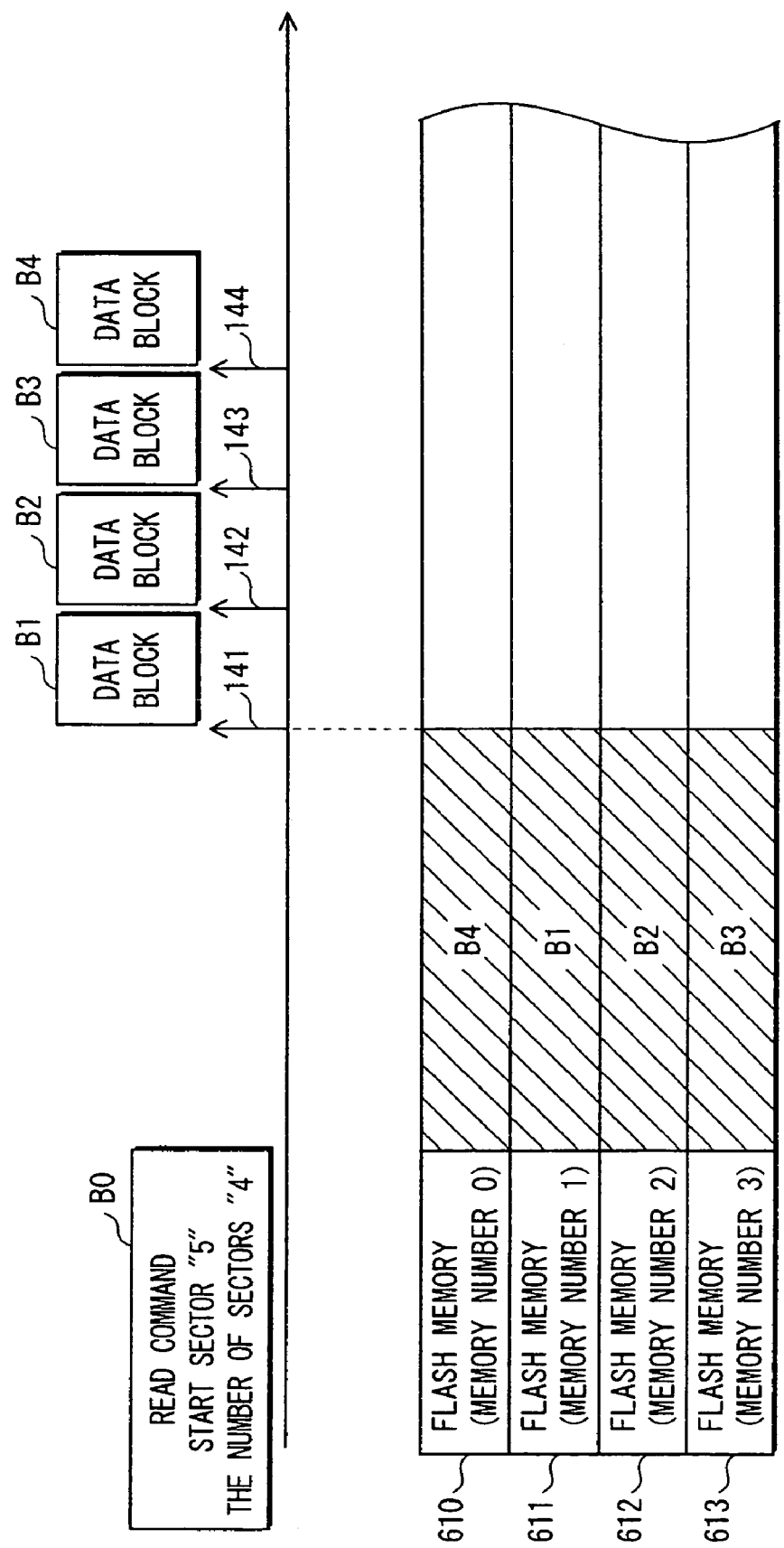
FIG. 15 is a time chart showing the data read operations of the memory card 600 and PC 100.

Next are described timings of giving and receiving commands and data between the memory card 600 and the PC 100 and read operation timings of the flash memories 610 to 613 in the memory card 600 when data is read from the memory card 600, with the aid of a time chart shown in FIG. 15.

In FIG. 15, a command that the memory card 600 receives from the PC 100 and data blocks output from the memory card 600 to the PC 100 are depicted along the time course of the read operations, and the horizontal axis represents time. In addition, the figure shows operation conditions of the flash memories 610 to 613 at each instant of time.

The memory card 600 receives a read command B0 from the PC 100. The read command B0 includes the start sector number "5" and the number of sectors "4".

The memory card 600 calculates the memory numbers "1", "2", "3" and "0" based on the start sector number "5" and the number of sectors "4". The memory card 600 reads out data blocks from the flash memories 610 to 613 each corresponding to the calculated memory numbers: a data block B1 from the flash memory 611; a data block B2 from the flash memory 612; a data block B3 from the flash memory 613; and a data block B4 from the flash memory 610. The memory card 600 then transfers each of the readout data blocks to the buffer memory 609. When finishing the transfer of the data block from the flash memory 611, the memory card 600 outputs to the PC 100 a response 141 indicating that outputting one data block is possible. Subsequently, the memory card 600 outputs the data block B1 from the buffer memory 609 to the PC 100.

The reading speeds of the four flash memories are substantially the same, and therefore the transfer of the data blocks from the individual flash memories to the buffer memory 609 finishes at almost the same time.

At the time when the output of the data block B1 is finished, the data blocks B2 to B4 are still in the buffer memory 609. Accordingly, the memory card 600 outputs a response 142 indicating that outputting one data block is possible, and outputs the data block B2. When the output of the data block B2 is finished, the memory card 600 performs the output of a response 143 and then the data block B3, and subsequently the output of a response 144 and then the data block B4 in a similar fashion.

2.3 Summary and Advantageous Effects

As has been described above, the memory card 600 of Embodiment 2 obtains the available supply current value Iok from an external apparatus, and calculates the parallel write count Nw and the reading frequency fr in order to keep the current consumption value of the memory card 600 to no more than the obtained available supply current value Iok.

When receiving a write command from the external apparatus, the memory card 600 performs a data writing process by operating Nw pieces of flash memories in parallel.

When receiving a read command, the memory card 600 changes the frequency of the clock signal to be supplied to the flash memories 610 to 613 into the calculated reading frequency fr, and performs a data reading process by operating the four flash memories 610 to 613 in parallel.

Advantageous effects of the present embodiment are described next, using specific numerical values. Since effects for the writing process are the same as in Embodiment 1, only effects for the reading process are described here.

Assume that the write current consumption value Iw=120 mA; the maximum read current consumption value Irmax=100 mA; the maximum frequency=100 MHz; the number of memories N=4; the control current value a=100 mA; and the reading speed of each of the flash memories 610 to 613 is up to 10 MB/s.

The maximum current consumption value in this case is calculated using (Eq. 6):

$$Imax=Max(4\times120, 4\times100)+100=580\text{ mA}.$$

Suppose the available supply current value Iok of the PC 100 is 400 mA, then Iok<Imax. Accordingly, the memory card 600 calculates the reading frequency fr using (Eq. 7):

$$fr=100\times(400-100)/4/100=75\text{ MHz}.$$

The current consumption value of the flash memories for read operations is proportional to the operating frequency. Therefore, in the case where the read operations are performed by four flash memories at an operating frequency of 75 MHz, the amount of current consumed by the memory card 600 is:

$$Irmax\times(fr/fmax)\times N+a$$

$$=100\times(75/100)\times4+100$$

$$=400\text{mA}.$$

Thus, the current consumption value for operating the four flash memories 610 to 613 in parallel at the operating frequency 75 MHz is kept within the available supply current value of the PC 100, 400 mA.

Since the reading speed of the flash memories is proportional to the operating frequency, the reading speed of the memory card 600 when the operating frequency is 75 MHz is: 10×(75/100)×4=30 MB/s. As a result, by reducing the operating frequency of the flash memories to 75 MHz and operating the four flash memories 610 to 613 in parallel, three times faster reading is accomplished when compared to the case where the reading process is performed at the maximum frequency with no parallel operations.

Thus, the reading process can be speeded up to the maximum extent possible within the power supply capacity of the PC 100.

Note that high voltage is applied to the flash memories, which subsequently accumulate electrical charge and thereby store data therein. Therefore, the consumption current during the write operations is proportional to the voltage application time, and the power-saving effect due to a change in the frequency cannot be expected. For this reason, the present embodiment has adopted a structure in which the frequency is changed only for the read operations.

3. Embodiment 3

Figure 16:
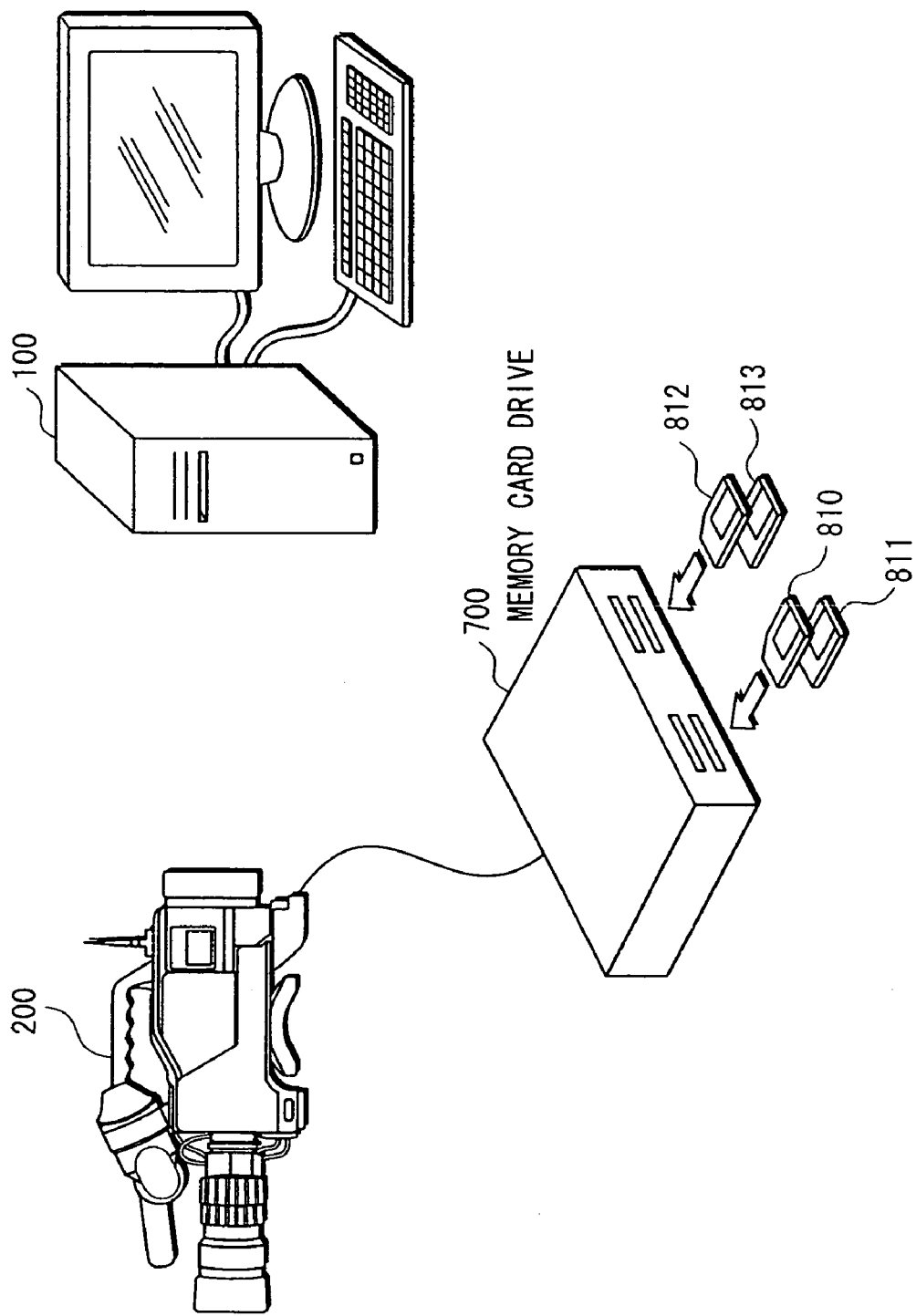
FIG. 16 shows an example of the use of a memory card drive 700.

In Embodiments 1 and 2, the present invention is illustrated as being a memory card having multiple flash memories therein. However, a memory card drive 700 shown in FIG. 16 is also within the scope of the present invention.

The memory card drive 700 is equipped with four memory card slots, and used while four memory cards 810, 811, 812 and 813 being placed therein. The memory card drive 700 is connected to the PC 100 or the video camera 200.

Like the memory card 300 of Embodiment 1, the memory card drive 700 calculates the number of memory cards allowed to operate in parallel within the electric power that the PC 100 or video camera 200 is able to supply, and operates the calculated pieces of memory cards in parallel.

Since the PC 100 and the video camera 200 are the same as those in Embodiment 1, their descriptions are left out here.

3.1 Memory Cards 810, 811, 812 and 813

Each of the memory cards 810, 811, 812 and 813 includes a control unit, a RAM and a nonvolatile memory. According to the control of the memory card drive 700, the memory cards 810 to 813 store therein a variety of information, and output the stored information.

3.2 Memory Card Drive 700

Figure 17:
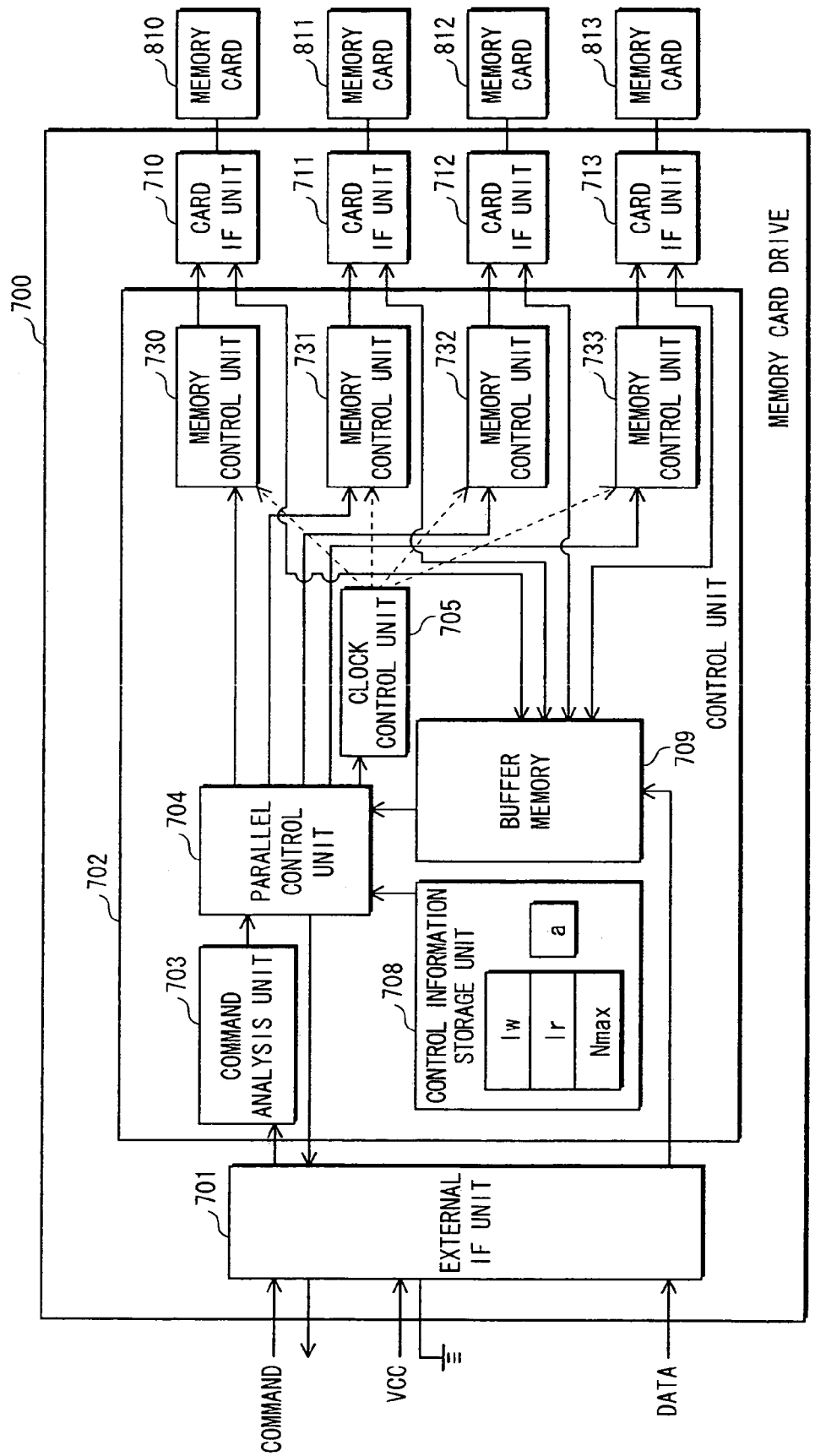
FIG. 17 is a block diagram showing a structure of the memory card drive 700.

The memory card drive 700 comprises, as shown in FIG. 17: an external IF unit 701; a control unit 702; and card IF units 710, 711, 712 and 713.

The control unit 702 includes: a command analysis unit 703; a parallel control unit 704; memory control units 730, 731, 732 and 733; a clock control unit 705; a control information storage unit 708; and a buffer memory 709.

The control unit 702 includes, concretely speaking, a microprocessor, a RAM and a ROM. Computer programs are stored in the RAM and ROM. The microprocessor operates according to the computer programs, and thereby the control unit 702 fulfills its function.

Next is described each unit constituting the memory card drive 700. The structures and operations of the command analysis unit 703, clock control unit 705 and buffer memory 709 included in the control unit 702 are the same as those of the command analysis unit 303, clock control unit 305 and buffer memory 309 of Embodiment 1, and therefore their descriptions are omitted here.

(1) External IF Unit 701 and Card IF Units 710, 711, 712 and 713

The external IF unit 701 transmits and receives various information between an external apparatus and the control unit 702, like the external IF unit 301 of the memory card 300 according to Embodiment 1. The external IF unit 701 also receives electric power supplied from the external apparatus and outputs the received power to each circuit constituting the memory card drive 700.

The card IF units 710, 711, 712 and 713 are connected to the memory cards 810, 811, 812 and 813, respectively, and input and output various information between the memory cards 810, 811, 812 and 813 and the memory control units 730, 731, 732 and 733. In addition, the card IF units 710, 711, 712 and 713 receive a clock signal from the clock control unit 705 via the memory control units 730, 731, 732 and 733, and supply the received clock signal to the memory cards 810, 811, 812 and 813.

Note that the data input and output speeds between the external IF unit 701 and the external apparatus are sufficiently fast, as compared with those between the card IF units 710, 711, 712 and 713 and the memory cards 810, 811, 812 and 813.

(2) Control Information Storage Unit 708

The control information storage unit 708 stores therein, as shown in FIG. 17: a write current consumption value Iw; a read current consumption value Ir; the maximum number of cards Nmax and a control current value a.

The write current consumption value Iw is the amount of current consumed by one group of a memory card, a card IF unit and a memory control unit when data is written to the memory card placed in the memory card drive 700. The read current consumption value Ir is the amount of current consumed by one group of a memory card, a card IF unit and a memory control unit when data is read from the memory card.

The maximum number of cards Nmax is the number of memory cards that can be attached to the memory card drive 700, i.e. the number of memory card slots. In the present embodiment, Nmax=4.

The control current value a is the sum of the consumption current for operating individual circuits other than the memory cards, card IF units and memory control units.

(3) Memory Control Units 730, 731, 732 and 733

The memory control unit 730 receives a clock signal from the clock control unit 705 and supplies the received clock signal to the memory card 810 via the card IF unit 710.

The memory control unit 730 detects, via the card IF unit 710, the memory card 810 being placed in and taken out.

The memory control unit 730 receives from the parallel control unit 704 a write direction and memory addresses indicating sectors for data writing. In addition, the memory control unit 730 receives a read direction and memory addresses from the parallel control unit 704.

Receiving a write direction and memory addresses, the memory control unit 730 transfers one data block from the buffer memory 709 via the card IF unit 710 to a sector corresponding to one of the received memory addresses in the memory card 810. After completing the transfer, the memory control unit 730 outputs to the parallel control unit 704 an end signal indicating that writing one data block is completed.

Receiving a read direction and memory addresses, the memory control unit 730 transfers a data block stored in a sector corresponding to one of the received memory addresses from the memory card 810 via the card IF unit 710 to the buffer memory 709. After completing the transfer, the memory control unit 730 outputs to the parallel control unit 704 an end signal indicating that writing one data block is completed.

In the same manner as the memory control unit 730, the memory control units 731 to 733 respectively control data input and output to/from the memory cards 811 to 813 via the card IF units 711 to 713.

(4) Parallel Control Unit 704

Figure 18:
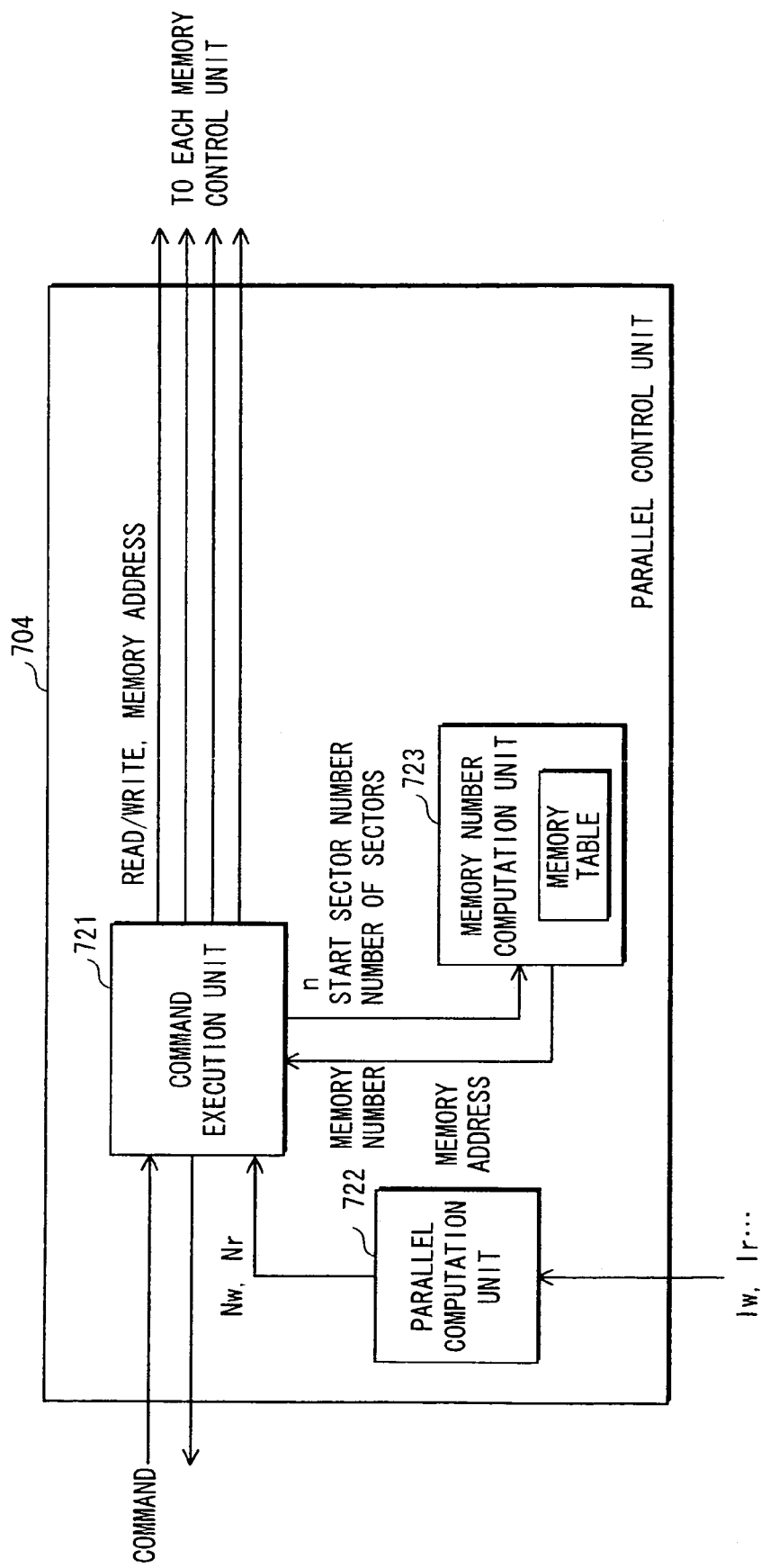
FIG. 18 is a block diagram showing a structure of a parallel control unit 704.

The parallel control unit 704 comprises, as shown in FIG. 18: a command execution unit 721; a parallel computation unit 722 and a memory number computation unit 723.

The structure and operations of the parallel control unit 704 are similar to those of the parallel control unit 304 according to Embodiment 1. Accordingly, the following describes in detail only different aspects of the parallel control unit 704, leaving out features shared with the parallel control unit 304.

(4-1) Parallel Computation Unit 722

The parallel computation unit 722 performs a computation similar to that performed by the parallel computation unit 322 of Embodiment 1, using the maximum number of cards Nmax in place of the number of memories N. The detailed operations are similar to those of the parallel computation unit 322, and the description is therefore omitted here.

(4-2) Memory Number Computation Unit 723

Since the detailed operations of the memory number computation unit 723 are similar to those of the memory number computation unit 323, only a brief explanation is provided here. Note that, in the present embodiment, the memory numbers "0" to "4" correspond to the memory cards 810 to 813, respectively.

The memory number computation unit 723 receives the start sector number and the number of sectors from the command execution unit 721, and is directed to calculate the memory numbers.

Directed to calculate the memory numbers, the memory number computation unit 723 computes (Eq. 4) and (Eq. 5), using the maximum number of memories Nmax in place of the number of memories N, for obtaining the memory numbers and the sector numbers. Subsequently, the memory number computation unit 723 generates a memory table including the calculated sector numbers and memory numbers as well as memory addresses, each of which is an address in memory cards corresponding to a different one of the memory numbers.

After generating the memory table, the memory number computation unit 723 outputs to the command execution unit 721 an computation end signal indication that the computation of memory numbers is completed.

(4-3) Command Execution Unit 721

The command execution unit 721 receives a variety of commands output from an external apparatus and analyzed by the command analysis unit 703.

When a received command is one for requesting the available supply current value, the command execution unit 721 performs initialization, which is the same process performed by the command execution unit 321 according to Embodiment 1, and receives from the parallel computation unit 722 a computation end signal indicating that the computation of the number of parallel write memory cards Nw and the number of parallel read memory cards Nr is finished properly.

When a received command is a write command indicating data writing, the command execution unit 721 receives data blocks from the external apparatus and directs data writing to each memory control unit in the same procedure of <Writing Process> performed by the command execution unit 321 of Embodiment 1, and thus performs write operations on Nw pieces of memory cards in parallel.

When a received command is a read command indicating data reading, the command execution unit 721 directs each memory control unit to read out data in the same procedure of <Reading Process> performed by the command execution unit 321 of Embodiment 1, and thus reads data from Nr pieces of memory cards in parallel.

3.3 Summary and Advantageous Effects

As has been described above, the memory card drive 700 of the present embodiment obtains the available supply current value of an external apparatus to which the memory card drive 700 is connected, and calculates, for data reading or for data writing, the number of memory cards allowed to operate in parallel within the obtained available supply current value.

Receiving a write command from the external apparatus, the memory card drive 700 operates the calculated Nw or fewer pieces of memory cards in parallel. When receiving a read command, the memory card drive 700 operates the calculated Nr or fewer pieces of memory cards in parallel.

In this way, it is possible to perform data reading and writing at the highest possible speeds within the power supply capacity of a connected external apparatus, as in the case of the memory card 300 of Embodiment 1.

3.4 Modified Examples of Embodiment 3

(1) The memory card drive 700 of Embodiment 3 controls the current consumption value of the memory card drive 700 to be no more than the available supply current value Iok of the external apparatus by calculating the number of memory cards Nw and Nr allowed to operate in parallel within the available supply current value Iok and restricting the number of parallel operating memory cards up to Nw or Nr.

As described in Embodiment 2, however, the current consumption value may be limited up to the available supply current value by changing the operating frequency for data reading.

(2) In Embodiment 3, the supply of the clock signal to nonoperating memory cards can be stopped.

In this case, the memory control unit 730 does not supply a clock signal received from the clock control unit 705 to the memory card 810.

When receiving a write direction and memory numbers from the command execution unit 721, the memory control unit 730 starts supplying a clock signal to the memory card 810. The memory control unit 730 subsequently starts transferring a data block from the buffer memory 709 to the memory card 810. When the transfer of the data block is finished, the memory control unit 730 outputs an end signal to the command execution unit 721 in the parallel control unit 704, and stops the supply of the clock signal to the memory card 810.

When receiving a read direction from the command execution unit 721 as well, the memory control unit 730 supplies a clock signal to the memory card 810 only during the transfer of a data block.

The memory control units 731 to 733 also perform similar control operations over the memory cards 811 to 813, respectively.

In this way, the memory card drive 700 supplies a clock signal only to operating memory cards, and stops supplying the clock signal to nonoperating memory cards.

Even if not performing data reading and writing, the control units of the memory cards 810 to 813 carry out predefined operations when receiving a clock signal and therefore consume electric power. Accordingly, stopping the supply of the clock signal to memory cards not performing data writing or reading leads to a cut in the power consumption by the amount otherwise consumed by these nonoperating memory cards.

(3) The above embodiment describes a situation where the memory card drive 700 is used with four memory cards placed therein; however, three or fewer memory cards may be used instead.

In this case, the command execution unit 721 detects, via the memory control units and card IF units, the memory cards being placed in and taken out, and stores therein the number of memory cards n currently attached to the memory card drive 700. Additionally, the command execution unit 721 associates the attached memory cards with card numbers.

For instance, in the case where the memory card 811 is not placed in the memory card drive 700, the command execution unit 721 associates the memory card 810 with the card number "0", the memory card 812 with the card number "1", and the memory card 813 with the card number "3".

When receiving a read command or a write command, the command execution unit 721 outputs to the memory number computation unit 723 the number of attached memory cards n together with the start sector number and the number of sectors.

The memory number computation unit 723 generates a memory table using n in place of Nmax.

This enables high-speed data input and output according to the number of attached memory cards, and improves user convenience since the user can freely choose the number of memory cards to be placed in the memory card drive 700.

4. Other Modifications

While the present invention has been illustrated and described in conjunction with Embodiments 1 to 3, it should be understood that the present invention is not confined to these embodiments, and the following modifications are also within the scope of the present invention.

(1) In Embodiments 1 and 2 above, the memory cards 300 and 600 are respectively equipped with four flash memories, however, the present invention is not limited to flash memories and may employ other recording devices instead. MRAMs (Magnetoresistive Random Access Memories) and ferroelectric memories are examples of such devices.

(2) In Embodiment 3 and the modified examples thereof, the memory cards placed in the memory card drive 700 are for example SD memory cards, ATA flash cards or the like.

(3) In Embodiment 3 and the modified examples thereof, the memory card drive 700 prestores therein a set of write and read current consumption values Ir and Iw for one type of memory cards to be placed therein. However, the memory card drive 700 may prestore multiple sets of write and read current consumption values Iw and Ir for different types of memory cards.

For instance, the memory card drive 700 may prestore write and read current consumption values Iws and Irs for SD memory cards and write and read current consumption values Iwa and Ira for ATA flash cards. Here, the memory card drive 700 determines a type of memory cards placed therein, and selects and uses either set of the write and read current consumption values-Iws and Irs, or Iwa and Ira.

(4) In Embodiment 3, the memory card drive 700 is provided as an outside device to an external apparatus; however, it may be housed in the external apparatus.

(5) In Embodiment 2, the clock control unit 605 changes the clock frequency using a PLL; however, a frequency divider may be used instead.

(6) The consumption current of the memory cards 300 and 600 is adjusted by changing the number of flash memories operating in parallel in Embodiment 1 while changing the operating frequency of flash memories in Embodiment 2. However, combining these features, the present invention may adjust the consumption current by changing both the number of parallel operating flash memories and the operating frequency of the flash memories.

(7) The present invention may be a method of accomplishing Embodiments 1 to 3 and the modified examples above.

(8) The present invention may be a computer program that achieves the method by a computer, or may be a digital signal representing the computer program.

The present invention may also be achieved by a computer-readable recording medium, such as a flexible disk, a hard disk, a CD-ROM, a MO, a DVD, a DVD-ROM, a DVD-RAM, a BD (Blu-ray Disc), or a semiconductor memory, on which the above-mentioned computer program or digital signal is recorded. The present invention may also be the computer program or the digital signal recorded on such a storage medium.

The present invention may also be the computer program or digital signal to be transmitted via networks, as represented by telecommunications, wire/wireless communications, and the Internet, or via data broadcasting.

The present invention may also be a computer system having a microprocessor and memory, wherein the memory stores the computer program and the microprocessor operates according to the computer program.

The computer program or digital signal may be recorded on the above storage medium and transferred to an independent computer system, or alternatively, may be transferred to an independent computer system via the above network. Then, the independent computer system may execute the computer program or digital signal.

(9) The present invention includes a structure in which two or more of the above embodiments and modifications are combined.

INDUSTRIAL APPLICABILITY

The present invention is operationally, continuously and repeatedly applicable in: industries producing recording media and input-and-output apparatuses for writing and reading a variety of digital data to/from recording media; industries manufacturing electric apparatuses for accessing recording media via the input-and-output apparatuses; and industries producing, processing, recording and selling a variety of digital data by using the electric apparatuses, recording devices and recording media.

The invention claimed is:

1. A recording device comprising:
one or more semiconductor memories;
an obtaining unit operable to obtain an upper limit of current to be supplied from an accessing apparatus to the recording device;
a command obtaining unit operable to obtain from the accessing apparatus at least one command, a type of which is one of a write command instructing data writing to the semiconductor memories and a read command instructing data reading from the semiconductor memories;
an access unit operable to receive current supply from the accessing apparatus and access the semiconductor memories according to a control signal; and
a control unit operable to calculate an access upper limit by subtracting an amount of current consumed by individual units other than the semiconductor memories and the access unit from the upper limit, set operating conditions of the access unit and the semiconductor memories according to the type of the obtained command, using the access upper limit,
generate the control signal based on the obtained command and the operating conditions, and output the control signal.

2. The recording device of claim 1, wherein
the control unit prestores therein a current consumption value representing an amount of current consumed by the access unit and the semiconductor memories, with respect to each type of the write and the read commands, and sets the operating conditions corresponding to the type of the obtained command using the access upper limit and the current consumption value.

3. The recording device of claim 2, wherein
the control unit sets the operating conditions that cause a parallel-operation count of memories out of the semiconductor memories to operate in parallel, the parallel-operation count being smaller than or equal to number of pieces of all the semiconductor memories, and outputs to the access unit the control signals generated based on the obtained command and the operating conditions, and instructing access to the parallel-operation count of memories, and
the access unit accesses the parallel-operation count of memories.

4. The recording device of claim 3, wherein
the current consumption value represents the amount of current consumed by the access unit and the semiconductor memories for causing one of the semiconductor memories to operate, and
the control unit calculates, as the parallel-operation count, a quotient obtained by dividing the access upper limit by the current consumption value.

5. The recording device of claim 4, wherein
the access unit includes as many access subunits as the semiconductor memories, and each of the access subunits corresponds to a different one of the semiconductor memories,
the control unit generates the control signal that includes as many access signals as the parallel-operation count of memories, each of the access signals is for instructing a different one of the access subunits to access a corresponding semiconductor memory thereof,
the control unit outputs each of the access signals to a corresponding one of the access subunits, and
access subunits that received the access signals access corresponding semiconductor memories according to the received access signals.

6. The recording device of claim 2, wherein
the control unit sets the operating conditions that cause the semiconductor memories to operate at a memory frequency which is no more than a maximum operating frequency of the semiconductor memories,
generates a clock signal having a same frequency as the memory frequency based on the command and the operating conditions, and outputs to the access unit the control signal including the generated clock signal, and
the access unit outputs the clock signals received from the control unit to the semiconductor memories and has access to the semiconductor memories.

7. The recording device of claim 6, wherein
the control unit prestores therein, as the current consumption value, a maximum current value which represents an amount of current consumed by the access unit and the semiconductor memories when each of the semiconductor memories operates at the maximum operating frequency, and calculates the memory frequency using the access upper limit and a ratio of the maximum operating frequency to the maximum current value.

8. The recording device of claim 7, wherein
the control unit prestores therein the maximum operating frequency together with the maximum current value.

9. The recording device of claim 6, wherein
the control unit prestores therein the current consumption value associated with the read command, and sets the operating conditions that causes the semiconductor memories to operate at the memory frequency in response to the read command.

10. The recording device of claim 6, wherein
the control unit includes a frequency divider, generates the clock signal having a same frequency as the memory frequency using the frequency divider, and outputs the control signal including the generated clock signal.

11. The recording device of claim 6, wherein
the control unit includes a PLL (Phase Lock Loop), generates the clock signal having a same frequency as the memory frequency using the PLL, and outputs the control signal including the generated clock signal.

12. The recording device of claim 2, wherein
the control unit sets, as the operating conditions, a 1st operating condition that causes a parallel-operation count of memories out of the semiconductor memories to operate in parallel and a 2nd operating condition that causes the semiconductor memories operate at an operating frequency no more than a maximum operating frequency of the semiconductor memories,
adopts at least one of the 1st and 2nd operating conditions based on the type of the obtained command, and generates the control signal based on the adopted operating condition.

13. The recording device of claim 2, wherein
the semiconductor memories are flash memories.

14. The recording device of claim 2, wherein
the semiconductor memories are nonvolatile magnetic memories.

15. The recording device of claim 1, wherein
the obtaining unit obtains the upper limit by a Set Features command complying with ATA (AT Attachment) standard.

16. The recording device of claim 1, wherein
the semiconductor memories are portable and detachable from the recording device, and
the obtaining unit, the access unit and the control unit make up a memory card drive device for reading and writing information from/to the semiconductor memories.

17. The recording device of claim 15, wherein
the control unit outputs the control signal including a clock signal, and
the access unit supplies the clock signal only to one or more of the semiconductor memories being accessed, and stops supply of the clock signal to remaining one or more of the semiconductor memories being not accessed.

18. An access method used in a recording device including one or more semiconductor memories, comprising the steps of:
obtaining an upper limit of current to be supplied from an accessing apparatus to the recording device;
obtaining from the accessing apparatus at least one command, a type of which is one of a write command instructing data writing to the semiconductor memories and a read command instructing data reading from the semiconductor memories;
receiving current supply from the accessing apparatus and accessing the semiconductor memories according to a control signal; and
calculating an access upper limit by subtracting an amount of current consumed by individual units other than the semiconductor memories and the access unit from the upper limit, setting operating conditions of the access unit and the semiconductor memories according to the type of the obtained command with use of the access upper limit,
generating the control signal based on the obtained command and the operating conditions, and outputting the control signal.

19. An access program used in a recording device including one or more semiconductor memories, and causing a computer to execute the steps of:
obtaining an upper limit of current to be supplied from an accessing apparatus to the recording device;
obtaining from the accessing apparatus at least one command, a type of which is one of a write command instructing data writing to the semiconductor memories and a read command instructing data reading from the semiconductor memories;
receiving current supply from the accessing apparatus and accessing the semiconductor memories according to a control signal; and
calculating an access upper limit by subtracting an amount of current consumed by individual units other than the semiconductor memories and the access unit from the upper limit, setting operating conditions of the access unit and the semiconductor memories according to the type of the obtained command with use of the access upper limit,
generating the control signal based on the obtained command and the operating conditions, and outputting the control signal.

20. The access program of claim 19 stored in a computer-readable recording medium.

21. A recording device that receives current supply from an accessing apparatus and is operated according to a command obtained from the accessing apparatus, the recording device comprising:
one or more semiconductor memories;
an access unit operable to access the semiconductor memories according to a control signal; and
a control unit operable to (i) set operating conditions of the semiconductor memories and the access unit according to the obtained command, using an upper limit of an amount of current consumed by the semiconductor memories and the access unit, and (ii) controls the access unit according to the control signal generated based on the obtained command and the operation conditions.

* * * * *